United States Patent
Kondo

(10) Patent No.: US 9,482,327 B2
(45) Date of Patent: Nov. 1, 2016

(54) ACTUATOR

(75) Inventor: Nobuki Kondo, Shizuoka (JP)

(73) Assignee: IAI Corporation, Shizuoka-shi (JP)

( * ) Notice: Subject to any disclaimer, the term of this patent is extended or adjusted under 35 U.S.C. 154(b) by 187 days.

(21) Appl. No.: 14/232,375

(22) PCT Filed: May 25, 2012

(86) PCT No.: PCT/JP2012/063493
§ 371 (c)(1),
(2), (4) Date: Jan. 31, 2014

(87) PCT Pub. No.: WO2013/008539
PCT Pub. Date: Jan. 17, 2013

(65) Prior Publication Data
US 2014/0157919 A1  Jun. 12, 2014

(30) Foreign Application Priority Data

Jul. 13, 2011 (JP) ................. 2011-155183
Dec. 1, 2011 (JP) ................. 2011-264151

(51) Int. Cl.
*F16H 25/22* (2006.01)
*F16H 25/20* (2006.01)

(52) U.S. Cl.
CPC .......... *F16H 25/2204* (2013.01); *F16H 25/20* (2013.01); *F16H 2025/204* (2013.01); *F16H 2025/2034* (2013.01); *Y10T 74/18576* (2015.01)

(58) Field of Classification Search
CPC .............................................. F16H 2025/204
See application file for complete search history.

(56) References Cited

U.S. PATENT DOCUMENTS 7,562,594 B2    7/2009 Nagai et al.
2003/0000322 A1*  1/2003 Nagai ................. F16H 25/2204
                                                    74/89.36

(Continued)

FOREIGN PATENT DOCUMENTS

CN       101562370 A    10/2009
DE    102009007952 A1 *  8/2010 ............. F16H 25/20

(Continued)

OTHER PUBLICATIONS

Japanese office action issued by the Japanese Patent Office in corresponding Japanese Patent App. No. 2011-264152, issued Apr. 21, 2015 (with translation).

(Continued)

*Primary Examiner* — Terence Boes
(74) *Attorney, Agent, or Firm* — Greer Burns & Crain Ltd.

(57) ABSTRACT

An actuator (10) includes a guide apparatus (30) that guides a rod 11 in a Y-axis direction. The guide apparatus (30) includes a slider (31), a rail (60) formed of a steel material, and balls (rolling elements) formed of a steel material. The slider (31) is supported by the rail (60) through the balls. Accordingly, even if torque originating from a rotation of the output shaft of a motor unit (20) is applied to the slider (31) through a ball screw shaft (71), the slider (31) does not move around the output shaft with respect to the rail (60). Hence, torque originating from the rotation of the output shaft is not likely to be transmitted to the rod (11) through the guide apparatus (30), thereby suppressing an occurrence of the wobbling of the leading end of the rod (11). In addition, a reduction of the work precision of the actuator (10) is preventable.

17 Claims, 38 Drawing Sheets

(56) References Cited

U.S. PATENT DOCUMENTS

2003/0164054 A1* 9/2003 Kuo .................. F16C 29/063
 74/89.33
2009/0260463 A1 10/2009 Fukano et al.

FOREIGN PATENT DOCUMENTS

| | | |
|---|---|---|
| JP | 55-18220 | 2/1980 |
| JP | 63-193637 | 12/1988 |
| JP | 01-288660 | 11/1989 |
| JP | 3-81408 | 8/1991 |
| JP | 5-209619 | 8/1993 |
| JP | 05-263813 | 10/1993 |
| JP | 07-110005 | 4/1995 |
| JP | 08-275646 | 10/1996 |
| JP | 11-247961 | 9/1999 |
| JP | 11-264451 | 9/1999 |
| JP | 2001-187953 | 7/2001 |
| JP | 2002-130419 | 5/2002 |
| JP | 2003-222128 | 8/2003 |
| JP | 2006-64162 | 3/2006 |

OTHER PUBLICATIONS

Int'l. Search Report issued in Int'l. App. No. PCT/JP2012/063493, dated Aug. 14, 2012 (with translation).
Office action issued by the Chinese Patent Office on Nov. 23, 2015.

\* cited by examiner (A)

(B)

(A)

(B)

(A)

(B)

(A)

(B)

(C)

(D)

(A)

(B)

(A)

(B)

(A)

(B)

(A)

(B)

(A)

(B)

(C)

(A)

(B)

(A)

(B)

(I)

(J)

(K)

(L)

(A)

(B)

(A)

(B)

(A)

(B)

(A)

(B)

(A)

(B)

ACTUATOR

TECHNICAL FIELD

The present invention relates to an actuator.

BACKGROUND ART

Rod-type linear actuators include, for example, a ball screw which converts the rotational motion of a motor into a linear motion of a rod. Such a conversion allows the rod to move reciprocately, and an arbitrary tool attached to the leading end of the rod carries out various work. According to such actuators, since the rotational motion of the motor is converted into a linear motion, torque due to the rotational motion of the motor is transmitted to the rod, and thus the leading end of the rod is likely to be wobbled. In this case, the work precision by the actuator may decrease.

With respect to this technical problem, the following Patent Literature 1 discloses an actuator including a rotation regulator that regulates the wobbling of a rod.

CITATION LIST

Patent Literature

Patent Literature 1: Unexamined Japanese Patent Application Kokai Publication No. 2002-130419

SUMMARY OF INVENTION

Technical Problem

The rotation regulator of the actuator disclosed in the above Patent Literature 1 is formed of a resin. Hence, when the motor rotates, torque is applied to the rotation regulator, and the rotation regulator elastically deforms. Accordingly, the leading end of the rod may be wobbled.

The present invention has been made in view of the aforementioned circumstances, and it is an objective of the present invention to provide an actuator that can suppress a wobbling of the leading end of a rod.

Solution to Problem

To accomplish the above objective, an actuator of the present invention includes: a motor including a rotation shaft; a ball screw comprising a ball screw shaft that rotates together with a rotation of the rotation shaft, and a ball screw nut that linearly moves together with a rotation of the ball screw shaft; a work shaft that is coupled with the ball screw nut so as to linearly move together with the ball screw nut, and has a tool attached to a leading end of the work shaft; a slider that is fastened to the work shaft and comprises a first groove formed along an actuation direction of the work shaft; a rail that faces with the first groove and comprises a second groove formed along the actuation direction of the work shaft, and formed of a rigid material; and a rolling element that is formed of a rigid material, rolls over the first groove and the second groove upon being held between the first groove and the second groove, and supports the slider in a movable manner.

The slider may include a rolling element retaining unit having a rolling element circulation channel formed in an interior of the rolling element retaining unit, the rolling element passing through the rolling element circulation channel, and the rolling element that has rolled a space between the first groove and the second groove may pass through the rolling element circulation channel, move to the space between the first groove and the second groove, and roll again the space between the first groove and the second groove.

The rolling element may be formed in a spherical shape, internal faces of the first groove and the second groove may be each formed as a curved face, and a curvature radius of the curved face is substantially equal to a radius of the rolling element.

The slider may include the two first grooves, and the rail may include the two second grooves and the two rolling element circulation channels, and the rolling element may be held between the first groove and the second groove in a direction orthogonal to the actuation direction of the work shaft.

The work shaft may be formed in a cylindrical shape having a hole formed therein where a leading end of the ball screw shaft is to be inserted, and an elastic member that contacts an inner periphery of the hole of the work shaft may be disposed at the leading end of the ball screw shaft.

The elastic member may have a groove formed along the actuation direction of the work shaft.

A plurality of the grooves formed in the elastic member may be formed along a circumference around a center of the ball screw shaft at an equal interval.

The actuator may further include a cover that is attached to the rail in a freely detachable manner and covers the slider.

A male screw may be formed on the work shaft, a female screw may be formed on the slider, and the work shaft may be fastened to the slider upon engagement of the male screw with the female screw.

An expansion slot may be formed in the slider, and the work shaft may be fastened to the slider by reducing a slot width of the expansion slot.

A threaded hole for fitting therein a set screw may be formed in the slider, and the work shaft may be fastened to the slider upon abutment with the set screw fitted in the threaded hole.

The actuator may further include a work shaft supporter that is disposed near the leading end of the work shaft, and supports the work shaft in a manner movable linearly. The work shaft supporter may include a rolling element that rolls a space between the work shaft supporter and the work shaft.

The actuator may further include a guide shaft unit that includes: a guide shaft that guides a linear motion of the work shaft through a linear motion together with a linear motion of the work shaft; and a guide shaft supporter that supports the guide shaft in a manner movable linearly.

The guide shaft unit may be formed at both sides of the work shaft so as to hold therebetween the work shaft.

The guide shaft supporter may include a rolling element that rolls a space between the guide shaft supporter and the guide shaft.

The two sliders may be fastened to the work shaft.

Advantageous Effects of Invention

According to the present invention, the slider is supported by the rail formed of a rigid material through the rolling element formed of a rigid material. Hence, even if torque originating from a rotation of a motor is applied to the slider, the slider does not move around the rotation axis of the motor relative to the rail. Therefore, torque originating from the rotation of the motor is not likely to be transmitted to the work shaft (rod) through the slider, thereby suppressing an occurrence of the wobbling of the leading end of the work shaft. In addition, a reduction of the work precision of the actuator is preventable.

DESCRIPTION OF EMBODIMENTS

An explanation will be given of an actuator 10 according to an embodiment of the present invention. Note that an X-Y plane in the figures is a horizontal plane, and a direction along a Z-axis in the figures is a vertical direction.

Figure 1:
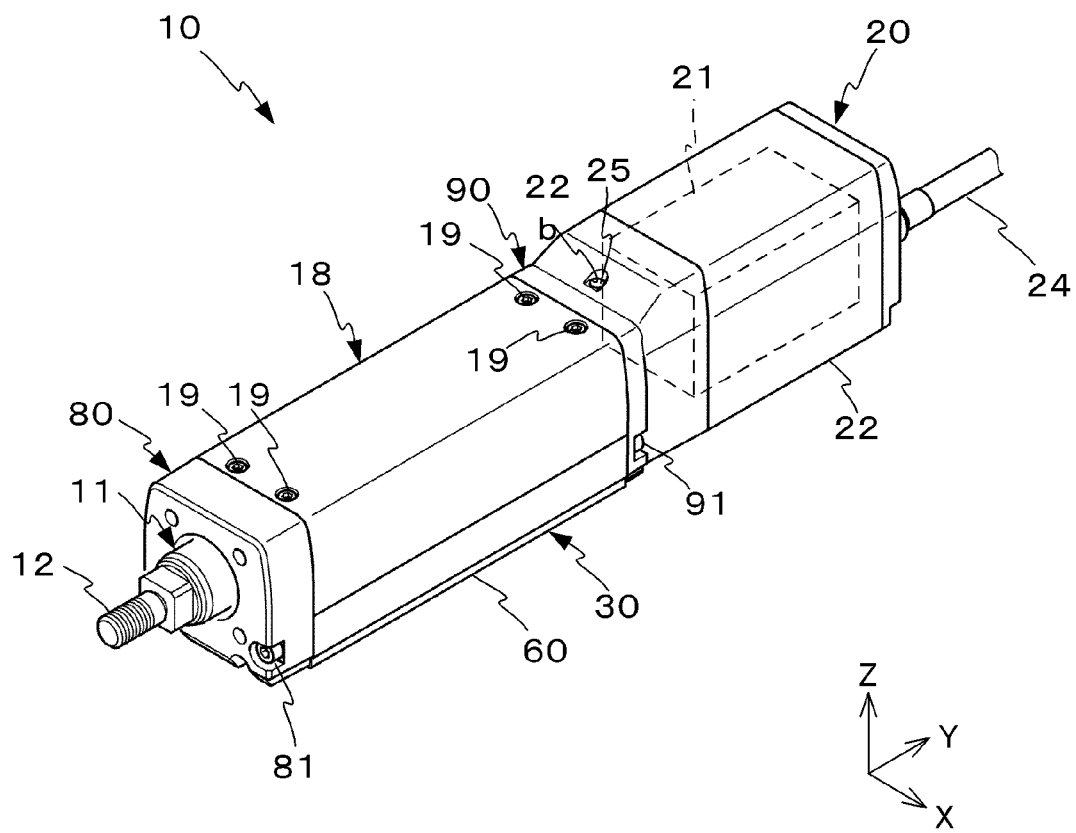
FIG. 1 is a perspective view illustrating an actuator according to an embodiment of the present invention.

As illustrated in FIG. 1, the actuator 10 is a linear actuator that includes a rod 11 (work shaft) moving reciprocately in a Y-axis direction. This actuator 10 includes the rod 11, a motor unit 20, a front housing 80, a bearing housing 90, and a cover 18.

Figure 2:
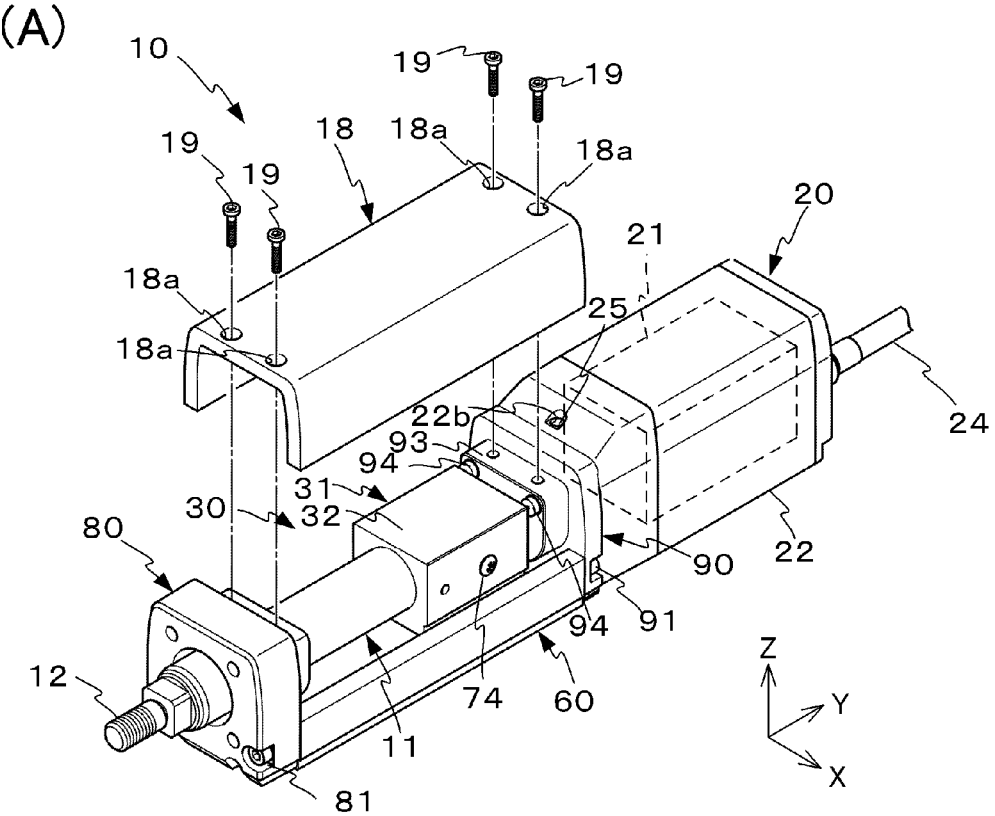
FIG. 2A is a perspective view illustrating the actuator with a cover being detached.
FIG. 2B is a Y-Z cross-sectional view illustrating the actuator with the cover being detached.
Figure 2:
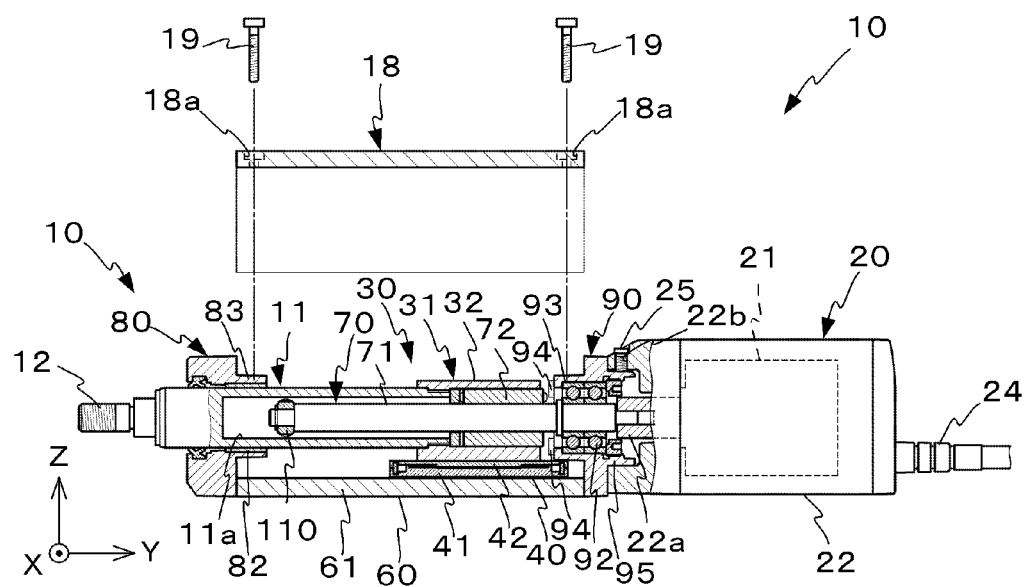

The cover 18 is formed by, for example, an aluminum extrusion. As illustrated in FIG. 2A, the cover 18 is formed with through-holes 18a that pass all the way through in the Z-axis direction, and is fastened to the front housing 80 and the bearing housing 90 by bolts 19.

As illustrated in FIGS. 2A and 2B, the actuator 10 includes, in addition to the rod 11 and the like, a guide apparatus 30 that guides the rod 11 in the Y-axis direction, and a ball screw 70 that converts a rotation of the motor unit 20 into a linear motion.

Figure 3:
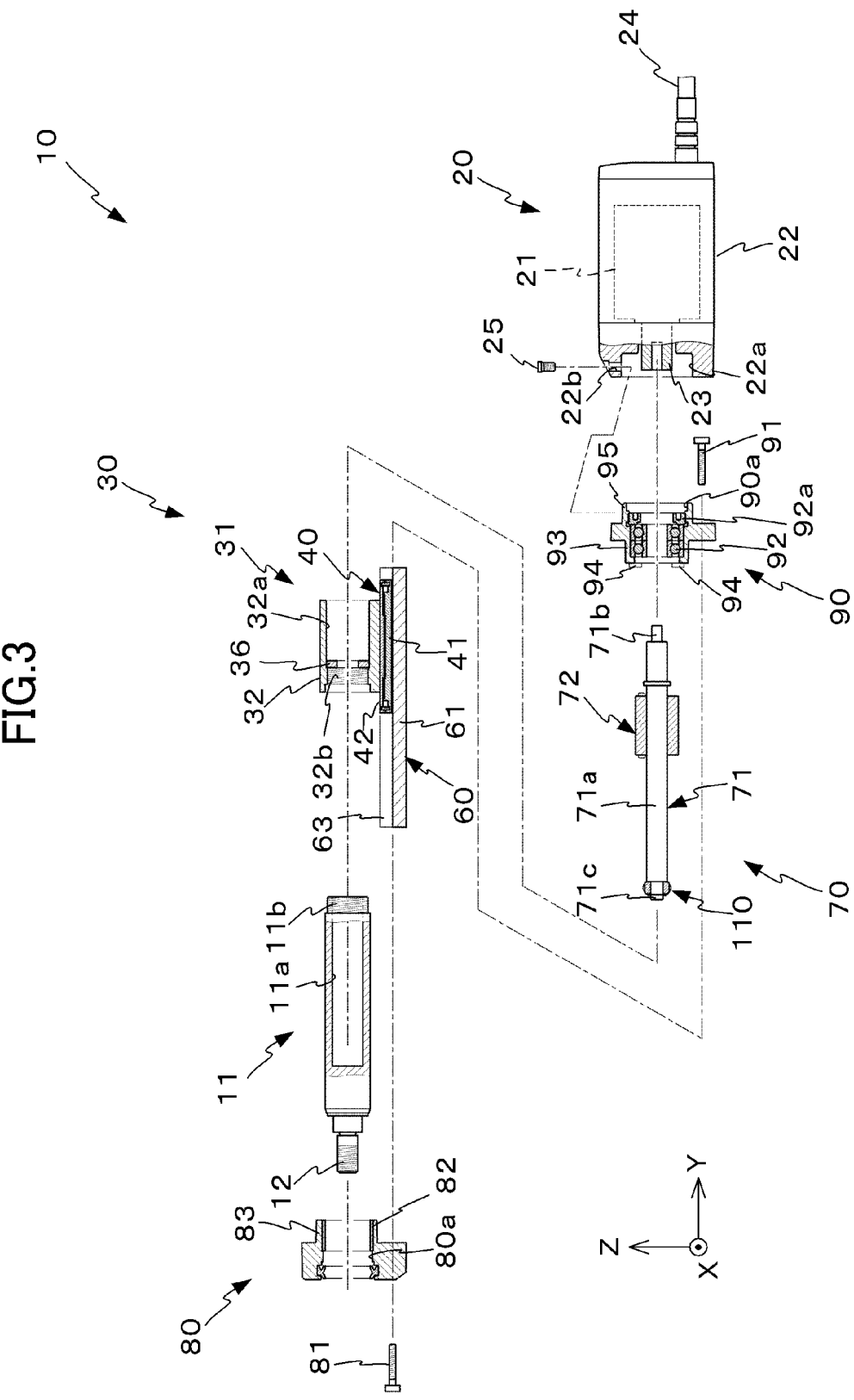
FIG. 3 is an exploded cross-sectional view of the actuator.

As illustrated in FIG. 3, the rod 11 is a cylindrical member having a hole 11a formed therein, and is formed of, for example, stainless-steel. A leading end attachment 12 having a male screw formed on the outer periphery is fastened to an end of the rod 11 at a −Y side by screwing. In addition, a male screw 11b is formed on the outer periphery of an end of the rod 11 at the +Y side.

The motor unit 20 includes a motor 21, a motor housing 22 that retains thereinside the motor 21, and an actuator cable 24.

The motor 21 is, for example, a stepping motor, and includes an output shaft 23, a rotor, a stator, an encoder, a reduction gear, and the like. Power from a power source is supplied to the motor 21 through the actuator cable 24. When the power is supplied to the motor 21, the rotor of the motor 21 rotates. The rotation of the rotor is subjected to a speed reduction by the reduction gear at a predetermined reduction ratio for example, and is output to the output shaft 23. In addition, the leading end of the output shaft 23 is structured as a coupling (joint).

The motor housing 22 is a casing in a substantially rectangular shape, and an opening 22a is formed in the face of the motor housing 22 at the −Y side. The output shaft 23 of the motor 21 is exposed to the exterior through this opening 22a. A threaded hole 22b that passes all the way through in the Z direction is formed at the upper side (+Z side) of the opening 22a. A bolt 25 is fitted in this threaded hole 22b.

Figure 4:
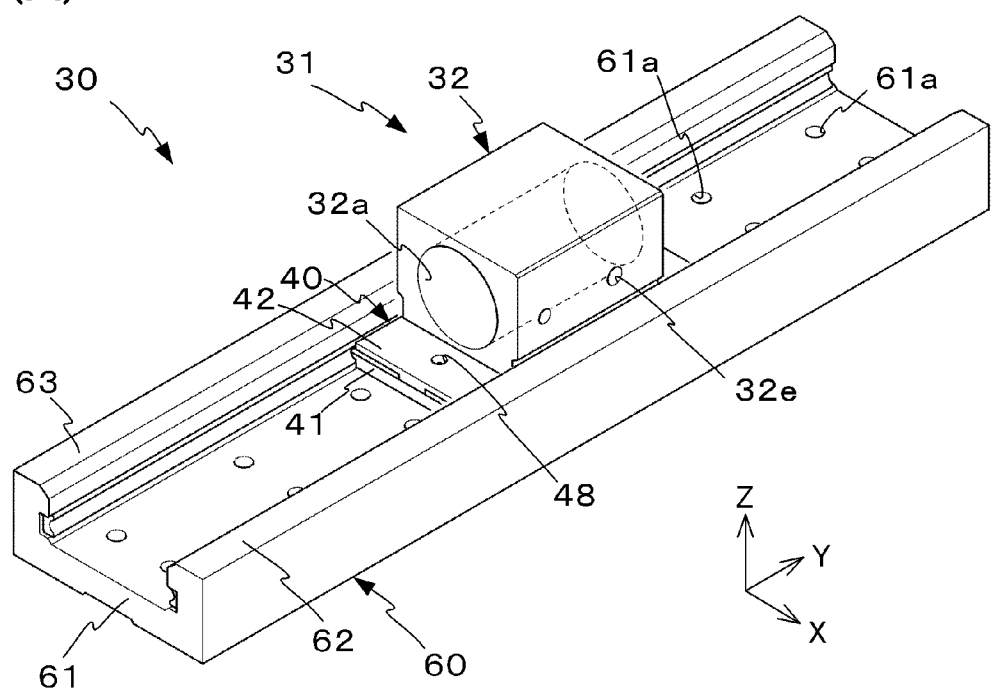
FIG. 4A is a perspective view of a guide apparatus.
FIG. 4B is an X-Z cross-sectional view of the guide apparatus.
Figure 4:
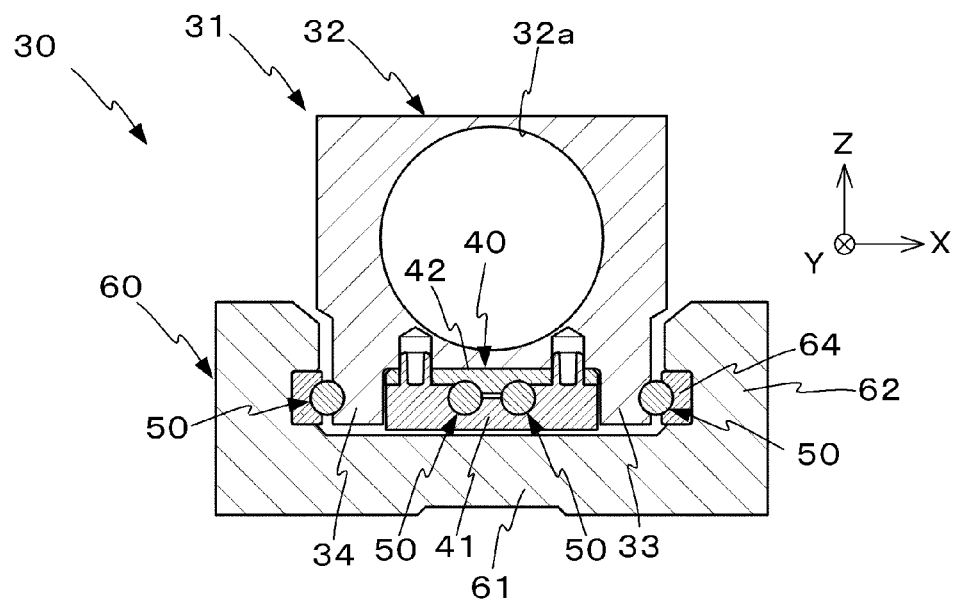

The guide apparatus 30 has the rod 11 fastened to a slider 31, thereby guiding the rod 11 in both +Y direction and −Y direction. As illustrated in FIGS. 4A and 4B, this guide apparatus 30 includes the slider 31, a rail 60, and balls 50 (rolling elements) disposed between the slider 31 and the rail 60. The balls 50 are each formed of a rigid material, and more specifically, steel. The multiple balls 50 are disposed between the slider 31 and the rail 60.

Figure 5:
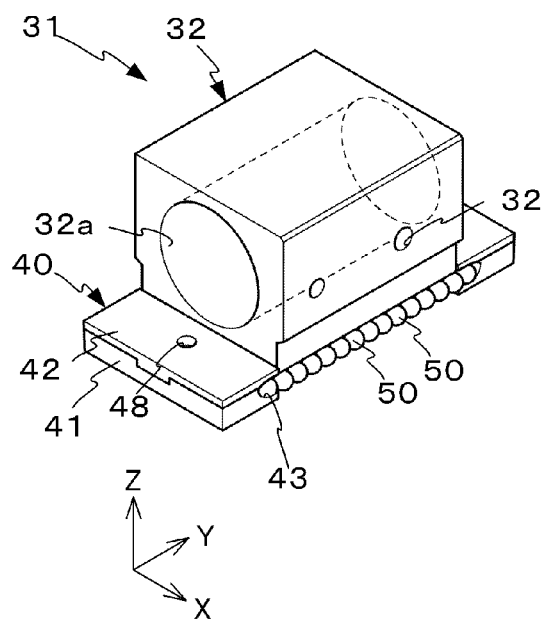
FIG. 5A is a perspective view illustrating a slider.
FIG. 5B is an exploded perspective view of the slider.
Figure 5:
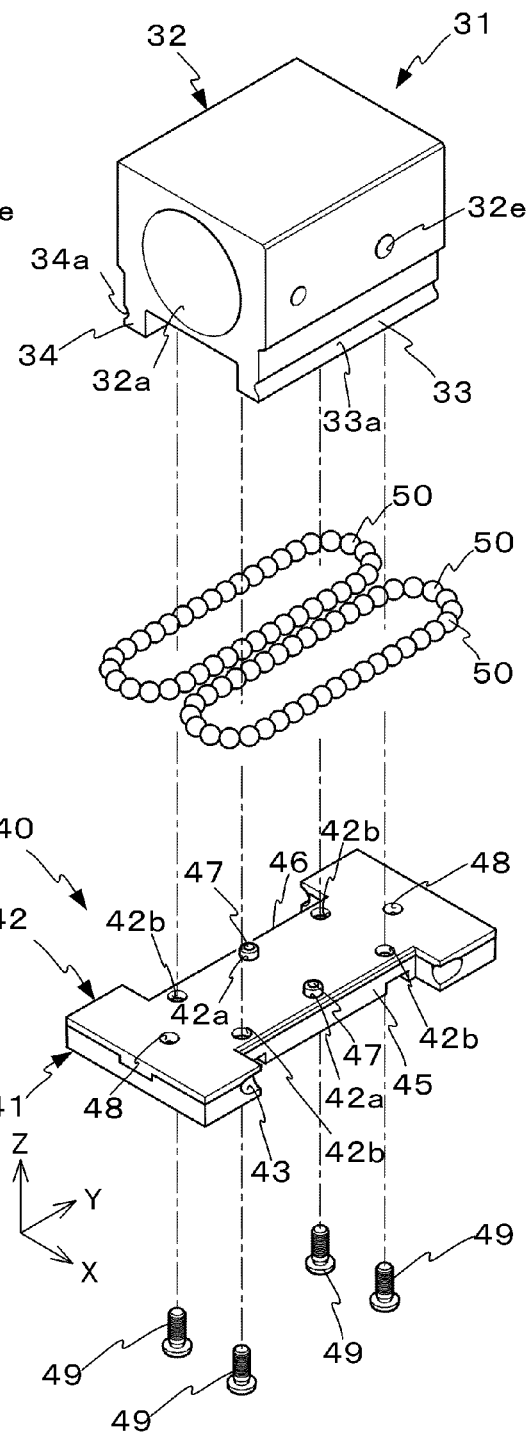
Figure 6:
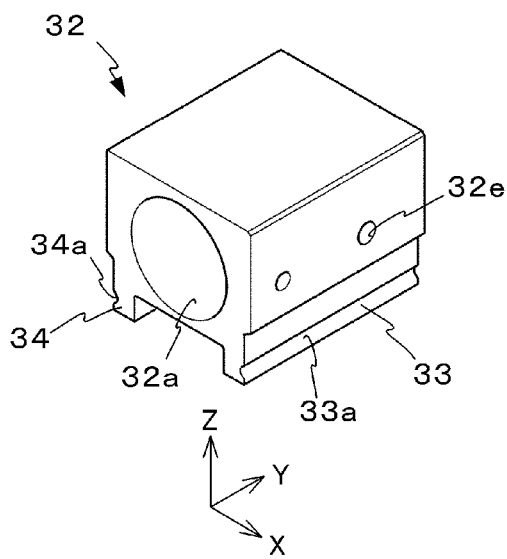
FIG. 6A is a (first) perspective view illustrating a slider main body.
FIG. 6B is a (second) perspective view of the slider main body.
FIG. 6C is an X-Z cross-sectional view of the slider main body.
FIG. 6D is a Y-Z cross-sectional view of the slider main body.
Figure 6:
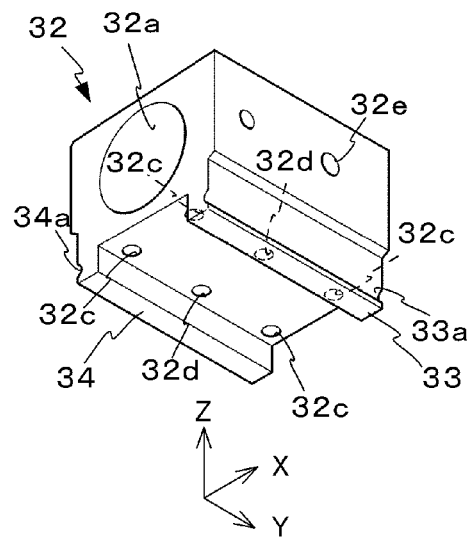
Figure 6:
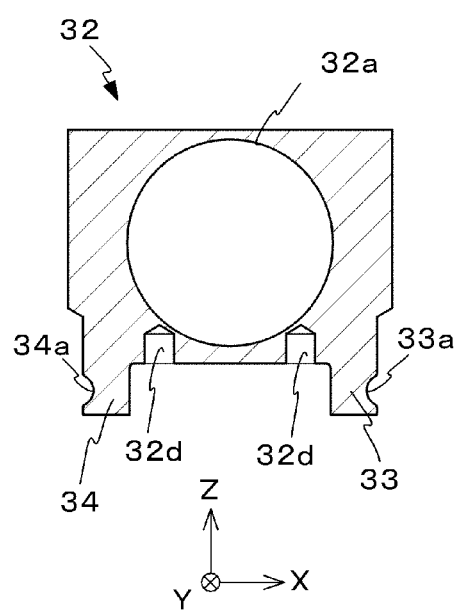
Figure 6:
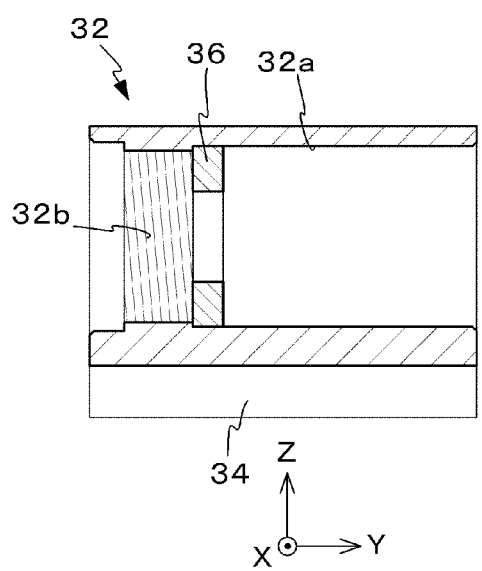

As illustrated in FIGS. 5A and 5B, the slider 31 is supported by the rail 60 in a manner movable in the Y-axis direction through the balls 50. The slider 31 is supported by the rail 60 only through the multiple balls 50. The slider 31 includes a slider main body 32, and a return 40 fastened to the face of the slider main body 32 at a −Z side by bolts 49.

Figure 7:
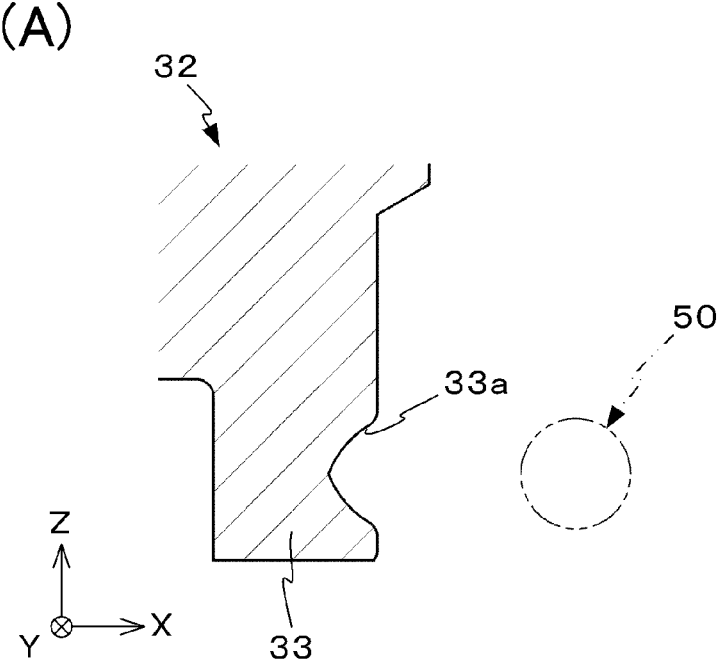
FIG. 7A is a (first) partial enlarged view in an X-Z cross-section of the slider main body.
FIG. 7B is a (second) partial enlarged view in the X-Z cross-section of the slider main body.
Figure 7:
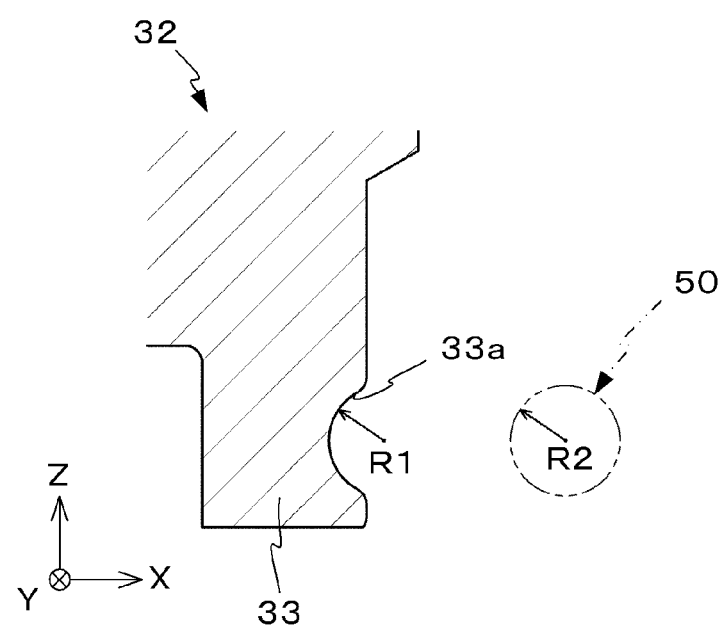

As illustrated in FIGS. 6A to 6D, the slider main body 32 is a member with a substantially rectangular shape formed with a through-hole 32a passing all the way through in the Y direction, and is formed of a metal like iron. A female screw 32b is formed in the inner periphery of the through-hole 32a near the opening at the −Y side. In addition, a pair of convexities 33, 34 protruding in the −Z direction is formed at the lower end of the slider main body 32. The convexities 33, 34 are formed along the Y direction, and grooves 33a, 34a where the balls 50 roll are formed in the respective external faces in the X direction. The inner faces of the grooves 33a and 34a are each formed as a substantially curved face. More specifically, as illustrated in FIG. 7A, the inner faces of the grooves 33a, 34a are each formed in a Gothic arch shape formed by two arcs. However, the shape of such an inner face is not limited to this example, and as illustrated in FIG. 7B, the inner faces of the grooves 33a, 34a may be each formed in a curved face that has a curvature radius R1 substantially equal to a radius R2 of the ball 50.

Moreover, as illustrated in FIGS. 6A to 6D, the slider main body 32 has a ring 36 fitted in the through-hole 32a. Moreover, threaded holes 32c and a pair of boss holes 32d are formed in the lower face (a surface at the −Z side) of the slider main body 32, and holes 32e are formed in a side face of the slider main body 32 at the +X side.

Figure 8:
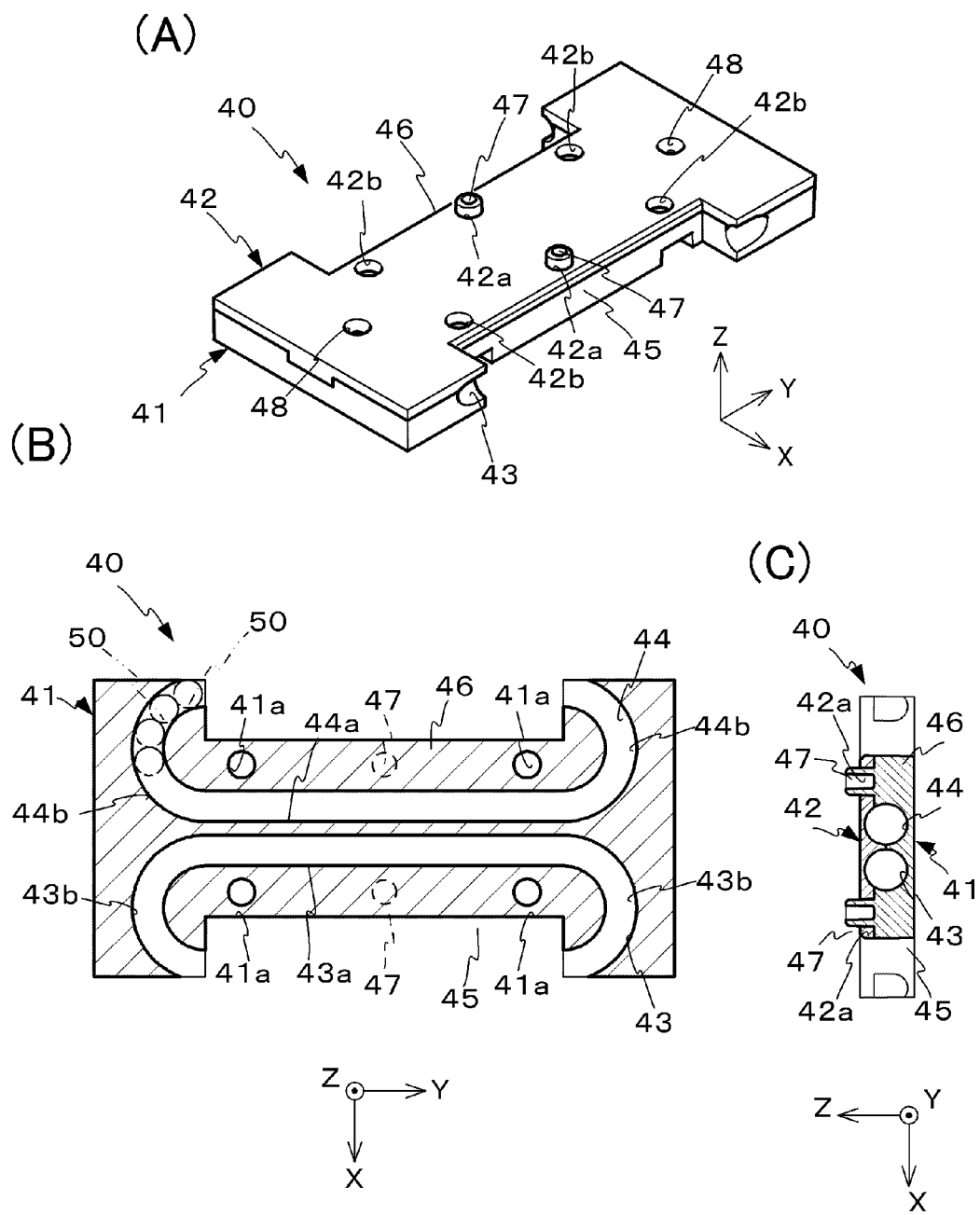
FIG. 8A is a perspective view of a return.
FIG. 8B is an X-Y cross-sectional view of the return.
FIG. 8C is an X-Z cross-sectional view of the return.

As illustrated in FIGS. 8A to 8C, the return 40 is a member formed with a pair of ball circulation channels 43, 44 where the balls 50 are disposed. Recesses 45, 46 are formed in the face of the return 40 at the +X side and the face thereof at the −X side. This return 40 includes a casing 41, and a lid 42 attached to the upper face of the casing 41. The casing 41 and the lid 42 are formed by, for example, injection molding of a poly-acetal resin.

The pair of ball circulation channels 43, 44 to allow the balls 50 to move are formed in the casing 41. The ball circulation channels 43, 44 are formed by respective straight channels 43a, 44a and respective curved channels 43b, 44b. The ball circulation channels 43, 44 are formed so as to have respective cross-sectional shapes in a circular shape having a diameter substantially equal to the diameter of the ball 50. In addition, two bosses 47 as a pair in a cylindrical shape are formed on the upper face (a surface at the +Z side) of the casing 41 protruding in the +Z direction. The boss 47 is formed so as to have a diameter which is substantially equal to the diameter of the boss hole 32d of the slider main body 32. In addition, four through-holes 41a passing all the way through in the Z direction are formed in the casing 41. Bolts 49 are fitted in the respective through-holes 41a.

The lid 42 is formed with a pair of boss holes 42a passing all the way through in the Z direction. The bosses 47 of the casing 41 are fitted in the boss holes 42a. In addition, the lid 42 is formed with four through-holes 42b passing all the way through in the Z direction. Bolts 49 are fitted in the through-holes 42b and the through-holes 41a of the casing 41. Still further, service holes 48 for filling grease are formed in the lid 42. The service holes 48 are in communication with the ball circulation channels 43, 44 through grease channels formed in the lid 42.

Figure 9:
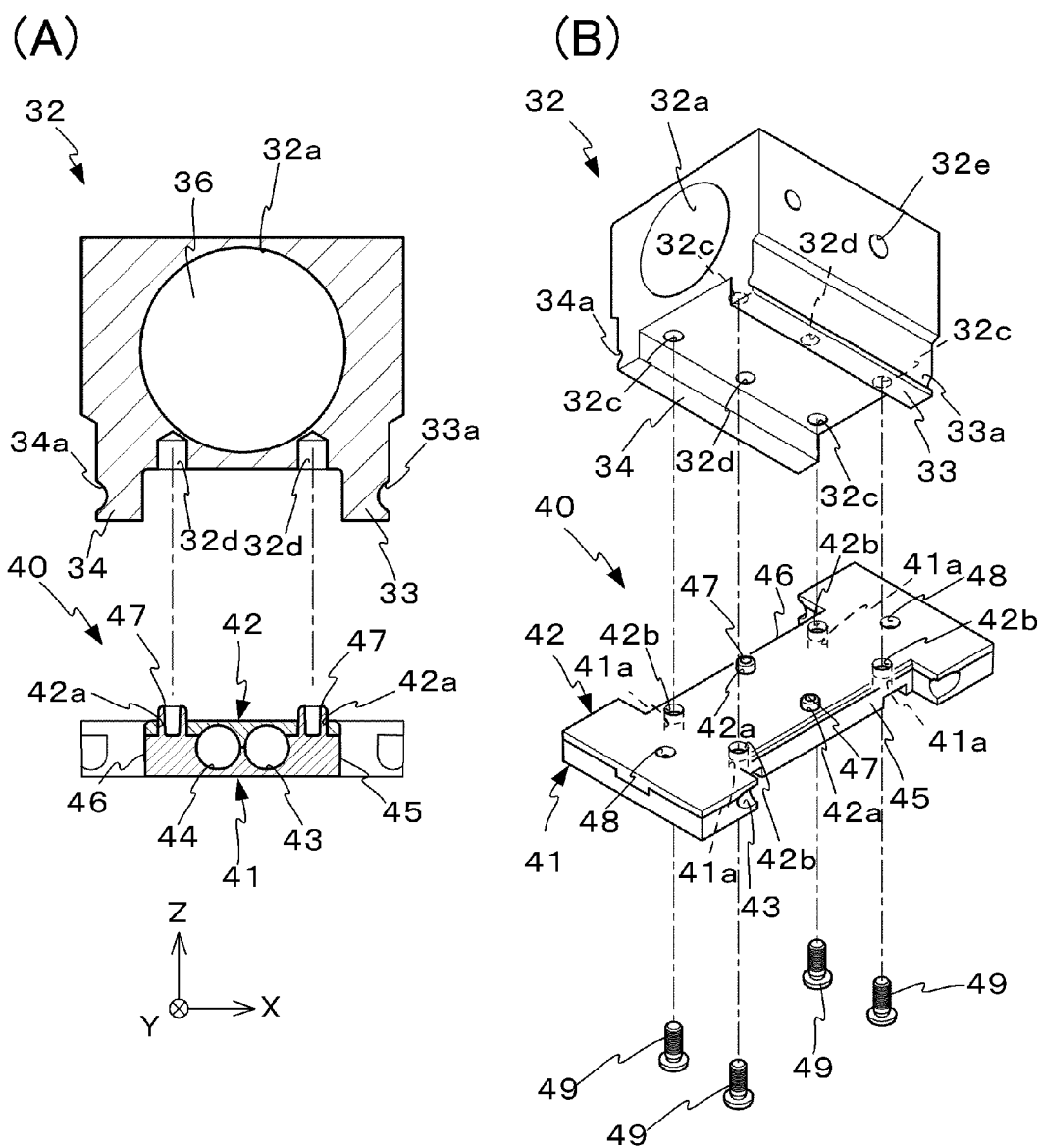
FIG. 9A is an X-Z cross-sectional view for explaining an assembling of the slider.
FIG. 9B is a perspective view for explaining an assembling of the slider.

Next, an explanation will be given of how to assemble the slider 31 with reference to FIGS. 9A and 9B.

First, as illustrated in FIG. 9A, the convexities 33, 34 of the slider main body 32 are engaged with the recesses 45, 46 of the return 40, respectively. At this time, the bosses 47 of the casing 41 of the return 40 are also fitted in the boss holes 32d of the slider main body 32. When the bosses 47 are fitted in the boss holes 32d, as is clear from FIG. 9B, the threaded holes 32c of the slider main body 32, the through-holes 42b of the lid 42 of the return 40, and the through-holes 41a of the casing 41 of the return 40 are disposed in a coaxial manner.

Next, as illustrated in FIG. 9B, the bolts 49 are screwed in the threaded holes 32c of the slider main body 32 via the through-holes 41a and the through-holes 42b. The screwing of the bolts 49 allows the return 40 to be fastened to the slider main body 32.

Figure 10:
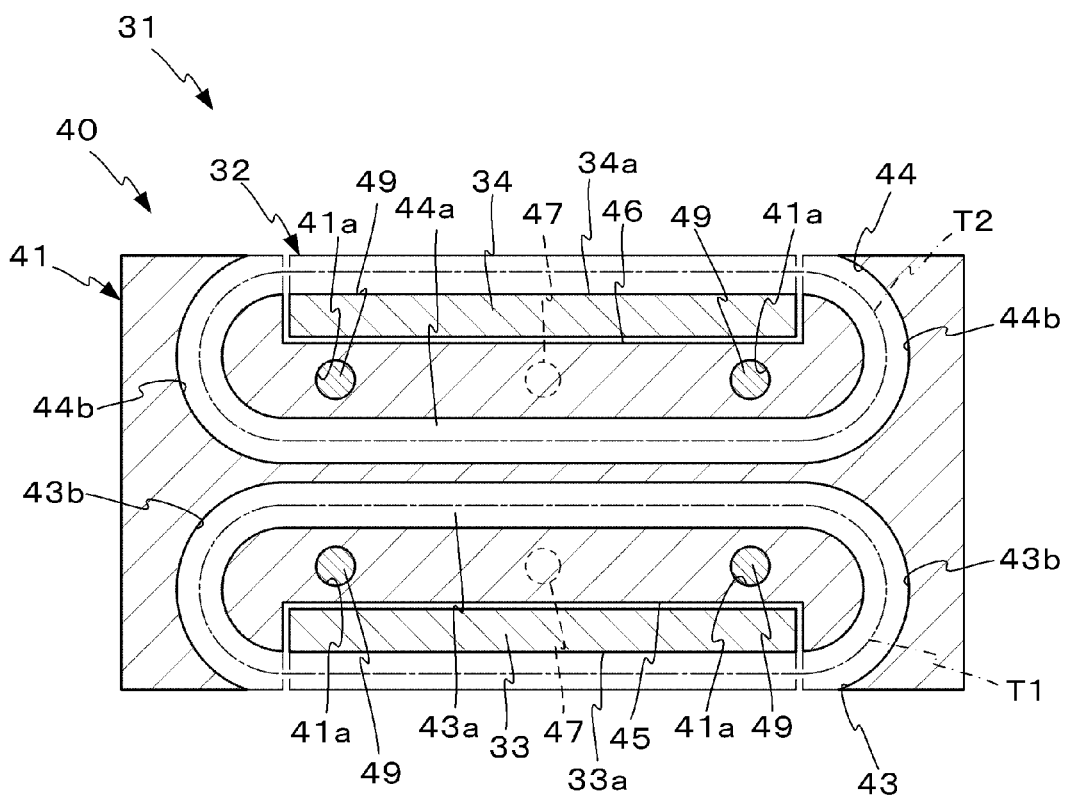
FIG. 10 is an X-Y cross-sectional view for explaining a raceway of balls.
Figure 10:
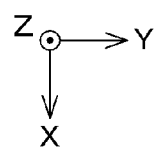

When the return 40 is fastened to the slider main body 32, as illustrated in FIG. 10, the ball circulation channel 43 formed in the casing 41 of the return 40, and the groove 33a formed in the convexity 33 of the slider main body 32 are disposed along a raceway T1 of the balls 50. Likewise, the ball circulation channel 44 formed in the casing 41 of the return 40, and the groove 34a formed in the convexity 34 of the slider main body 32 are disposed along a raceway T2 of the balls 50. Those raceways T1 and T2 are each formed in an oval shape including a straight portion and a curved portion. The assembling of the slider 31 is then completed.

The balls 50 are disposed in, for example, the ball circulation channels 43, 44 formed in the casing 41 of the return 40, the groove 33a formed in the convexity 33 of the slider main body 32, and the groove 34a formed in the convexity 34. Accordingly, the balls 50 are disposed in the raceways T1 and T2 illustrated in FIG. 10.

Figure 11:
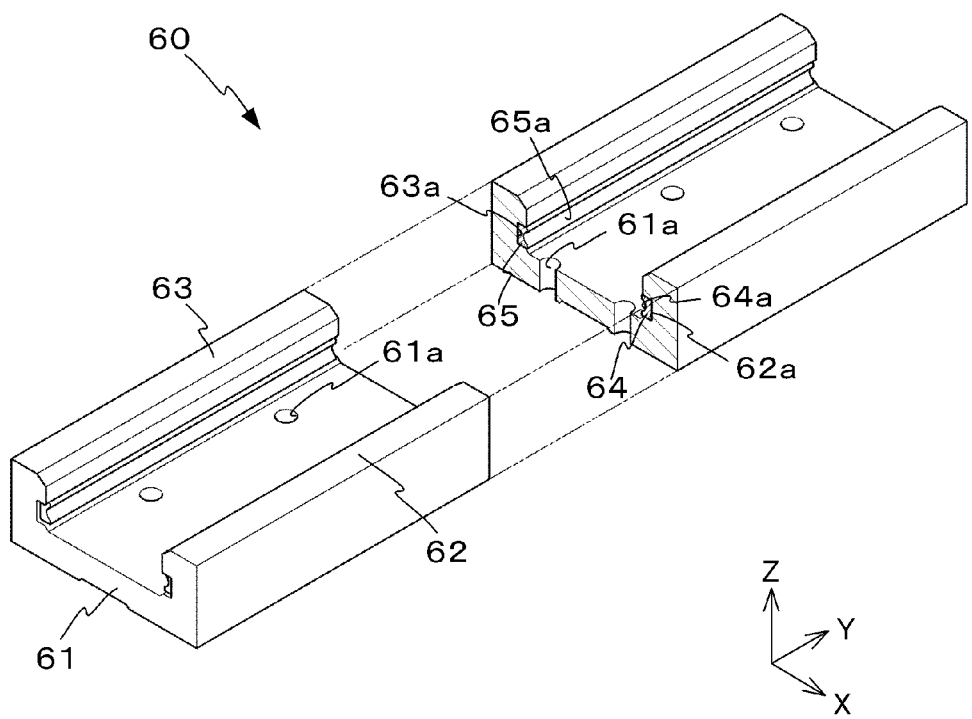
FIG. 11A is a perspective view illustrating a rail.
FIG. 11B is an X-Z cross-sectional view of the rail.
Figure 11:
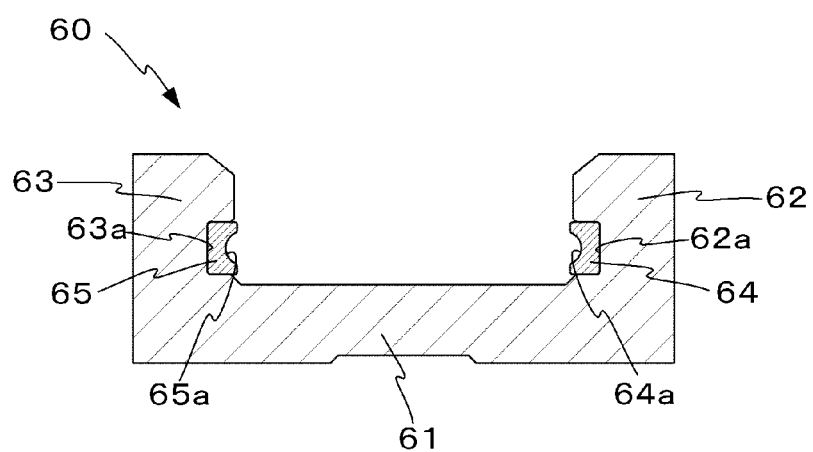
Figure 12:
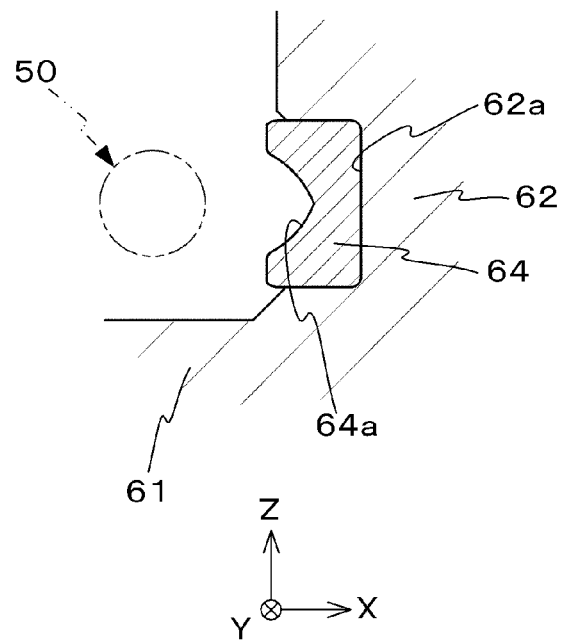
FIG. 12A is a (first) partial enlarged view in an X-Z cross-section of the rail.
FIG. 12B is a (second) partial enlarged view in the X-Z cross-section of the rail.
Figure 12:
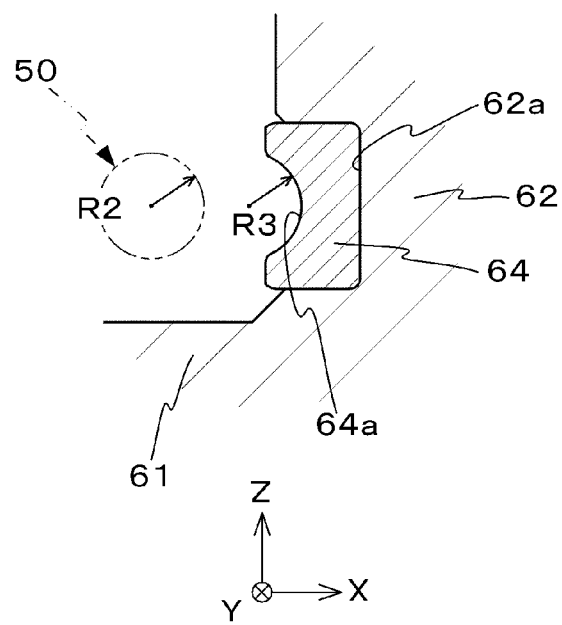

As illustrated in FIG. 11, the rail 60 includes a tabular base 61 having a lengthwise direction aligned with the Y-axis direction, and side walls 62, 63 formed with the base 61 at the +X side and the −X side. The rail 60 is formed by, for example, an extrusion of aluminum. Multiple through-holes 61a passing all the way through in the Z direction are formed in the base 61. In addition, recesses 62a, 63a are respectively formed in the face of the side wall 62 at the −X side and the face of the side wall 63 at the +X side (that is, the internal faces of the side walls 62, 63). Steel members 64, 65 formed in a substantially rectangular shape with a lengthwise direction aligned with the Y-axis direction are attached to the respective recesses 62a, 63a. Grooves 64a, 65a are formed in the face of the steel member 64 at the −X side and the face of the steel member 65 at the +X side, respectively. The grooves 64a, 65a are formed so as to face with each other, and the inner faces of the grooves 64a, 65a are each formed as a substantially curved face. More specifically, as illustrated in FIG. 12A, the inner faces of the grooves 64a, 65a are each formed in a Gothic arch shape including two arcs. The shape of such an inner face is not limited to this example, and as illustrated in FIG. 12B, the inner faces of the grooves 64a, 65a may be each formed as a curved face having a curvature radius R3 substantially equal to the radius R2 of the ball 50.

Figure 13:
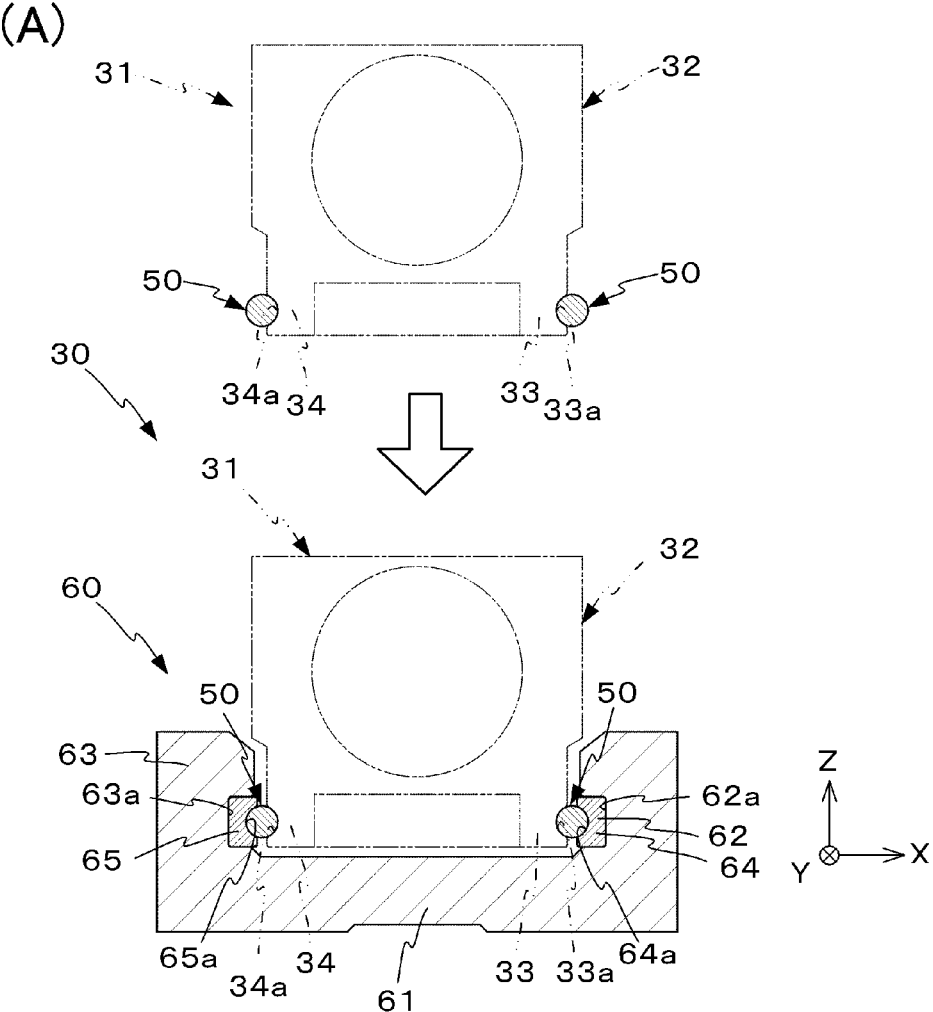
FIG. 13A is a (first) X-Z cross-sectional view for explaining an assembling of the guide apparatus.
FIG. 13B is a (second) X-Z cross-sectional view for explaining an assembling of the guide apparatus.
FIG. 13C is a (third) X-Z cross-sectional view for explaining an assembling of the guide apparatus.
Figure 13:
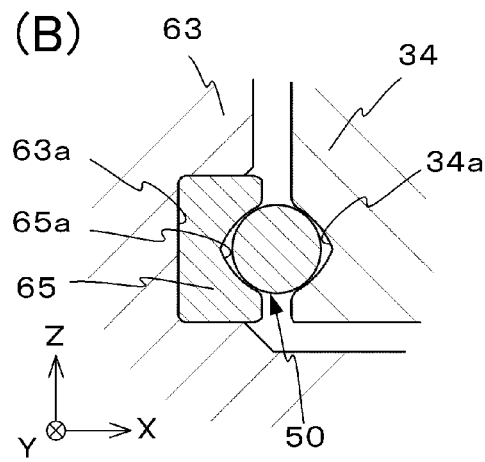
Figure 13:
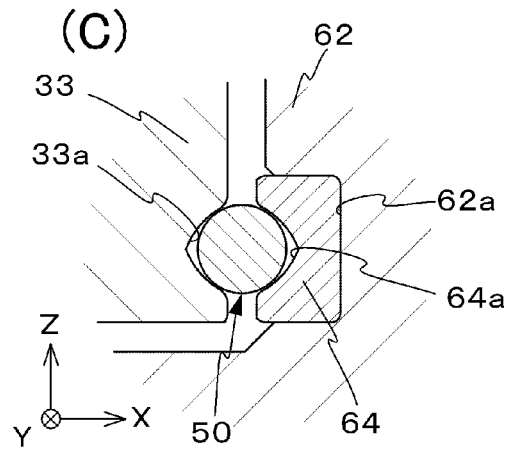

As illustrated in FIGS. 13A to 13C, the slider 31 is attached to the rail 60 through the multiple balls 50. When the slider 31 is attached to the rail 60, the balls 50 are held between the groove 64a of the steel member 64 of the rail 60 and the groove 33a formed in the convexity 33 of the slider main body 32 of the slider 31. Likewise, the balls 50 are held between the groove 65a of the steel member 65 of the rail 60 and the groove 34a formed in the convexity 34 of the slider main body 32 of the slider 31. When the balls 50 are held between the groove 64a and the groove 33a and the balls 50 are held between the groove 65a and the groove 34a, the slider 31 is supported by the rail 60 only through the balls 50. In addition, the slider becomes movable in the Y-axis direction relative to the rail 60.

Figure 14:
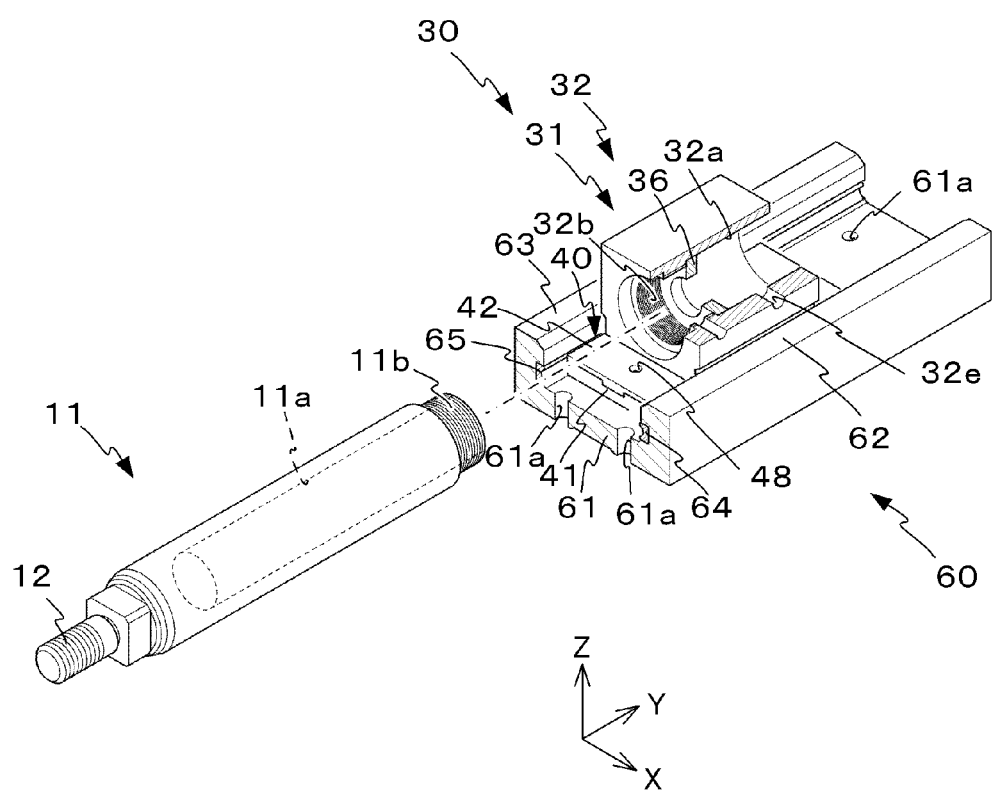
FIG. 14 is a perspective view for explaining how to attach a rod to the guide apparatus.

The guide apparatus 30 is finished upon attachment of the slider 31 to the rail 60. Next, as illustrated in FIG. 14, the end of the rod 11 at the +Y side is fitted in the through-hole 32a of the slider main body 32 of the slider 31. When the end of the rod 11 at the +Y side is fitted, the male screw 11b formed at the end of the rod 11 at the +Y side is engaged with the female screw 32b formed in the through-hole 32a. Hence, the rod 11 is fastened to the slider 31 of the guide apparatus 30.

Figure 15:
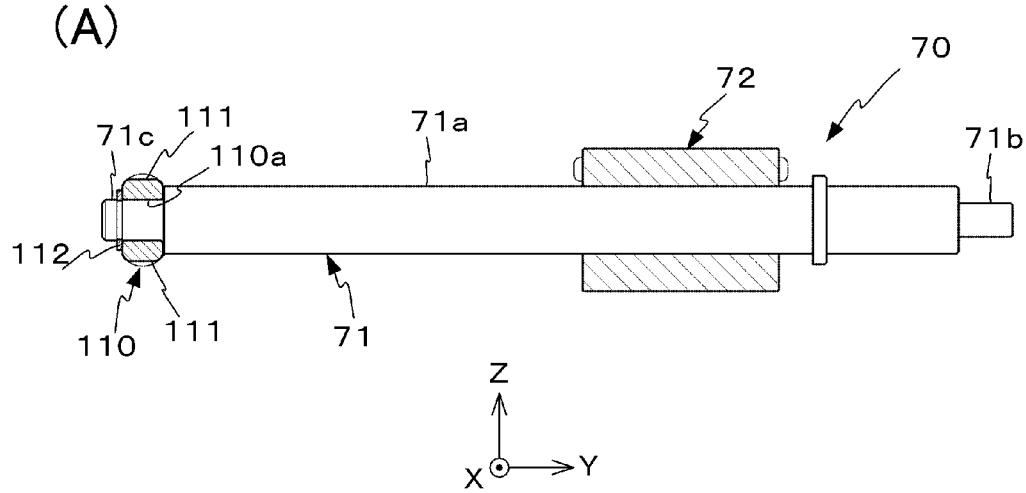
FIG. 15A is a Y-Z cross-sectional view illustrating a ball screw.
FIG. 15B is a perspective view illustrating the leading end of the ball screw shaft.
FIG. 15C is a Y-Z cross-sectional view illustrating the leading end of the ball screw shaft.
Figure 15:
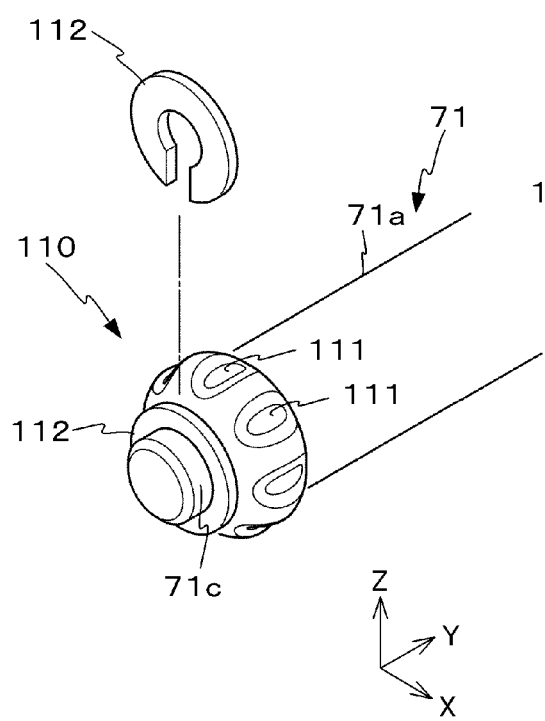
Figure 15:
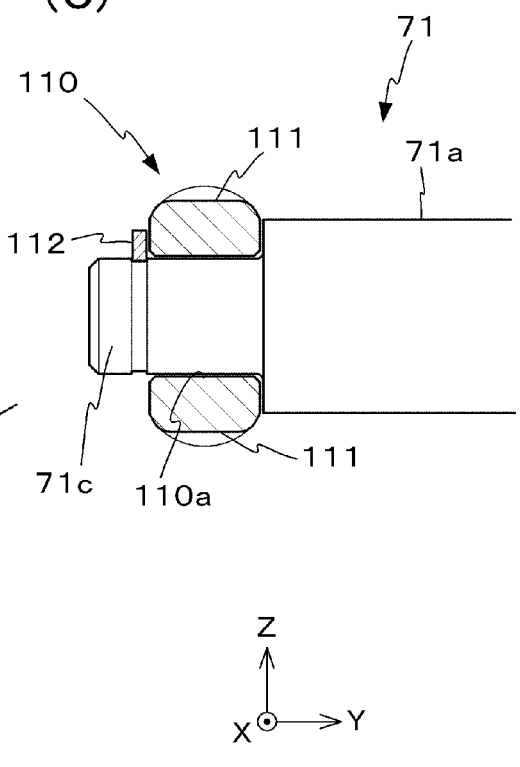

As illustrated in FIGS. 15A, 2B, and 3, the ball screw 70 includes a ball screw shaft 71, a ball screw nut 72, and an elastic member 110 attached to an end of the ball screw shaft 71 at the −Y side.

As illustrated in FIG. 15A, the ball screw shaft 71 includes a ball screw shaft main body 71a having an outer periphery formed as a spiral ball screw face, and small diameter portions 71b, 71c formed at the end of the ball screw shaft main body 71a at the +Y side and the end at the −Y side, respectively. The small diameter portions 71b, 71c are formed so as to have a diameter smaller than the diameter of the ball screw shaft main body 71a. In addition, the elastic member 110 is fitted with the small diameter portion 71c of the ball screw shaft 71, and is stopped by a stopper member 112. Accordingly, the elastic member 110 is attached to the ball screw shaft 71 in a rotatable manner.

The ball screw nut 72 is disposed on the outer periphery of the ball screw shaft main body 71a of the ball screw shaft 71. A ball screw part is formed in the inner periphery of the ball screw nut 72. This ball screw nut 72 is fitted to the ball screw shaft 71 through rigid balls. Accordingly, the rotation of the ball screw shaft 71 is converted into a linear motion of the ball screw nut 72.

Moreover, the small diameter portion 71b of the ball screw shaft 71 is structured as a coupling (joint). The small diameter portion 71b is coupled with the output shaft 23 of the motor unit 20 structured as a coupling in a manner rotatable together with the rotation of the output shaft 23. Accordingly, the rotation of the output shaft 23 is transmitted to the ball screw shaft 71.

Figure 16:
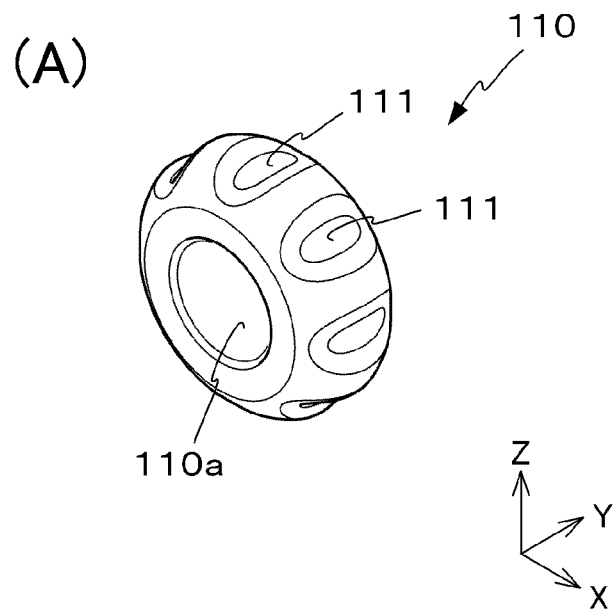
FIG. 16A is a perspective view illustrating an elastic member.
FIG. 16B is an X-Z cross-sectional view of the elastic member.
Figure 16:
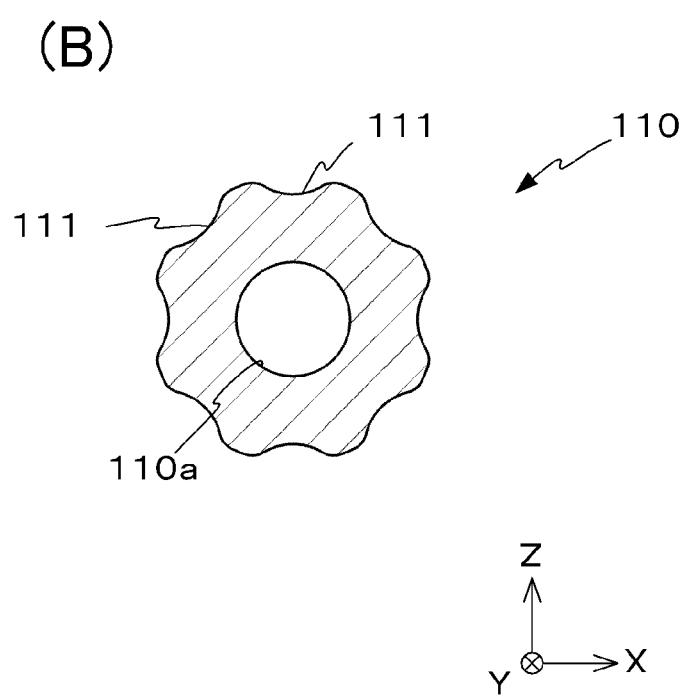

The elastic member 110 is formed of, for example, a resin, and as illustrated in FIG. 16, is formed in a ring shape having a through-hole 110a formed at the center. In addition, this elastic member 110 has an outer diameter substantially equal to the internal diameter of the hole 11a of the rod 11. More specifically, when the small diameter portion 71c of the ball screw shaft 71 is fitted in the hole 11a of the rod 11, the outer periphery of the elastic member 110 is formed so as to contact the inner periphery of the hole 11a. When the outer periphery of the elastic member 110 contacts the inner periphery of the hole 11a, the elastic member 110 can suppress a wobbling of the small diameter portion 71c of the ball screw shaft 71. That is, the elastic member 110 is structured as a wobble stopper that suppresses a wobbling of the small diameter portion 71c of the ball screw shaft 71. In addition, multiple grooves 111 formed at an equal interval along the circumference around the Y-axis are formed in the elastic member 110. In this embodiment, eight grooves 111 are formed.

Figure 17:
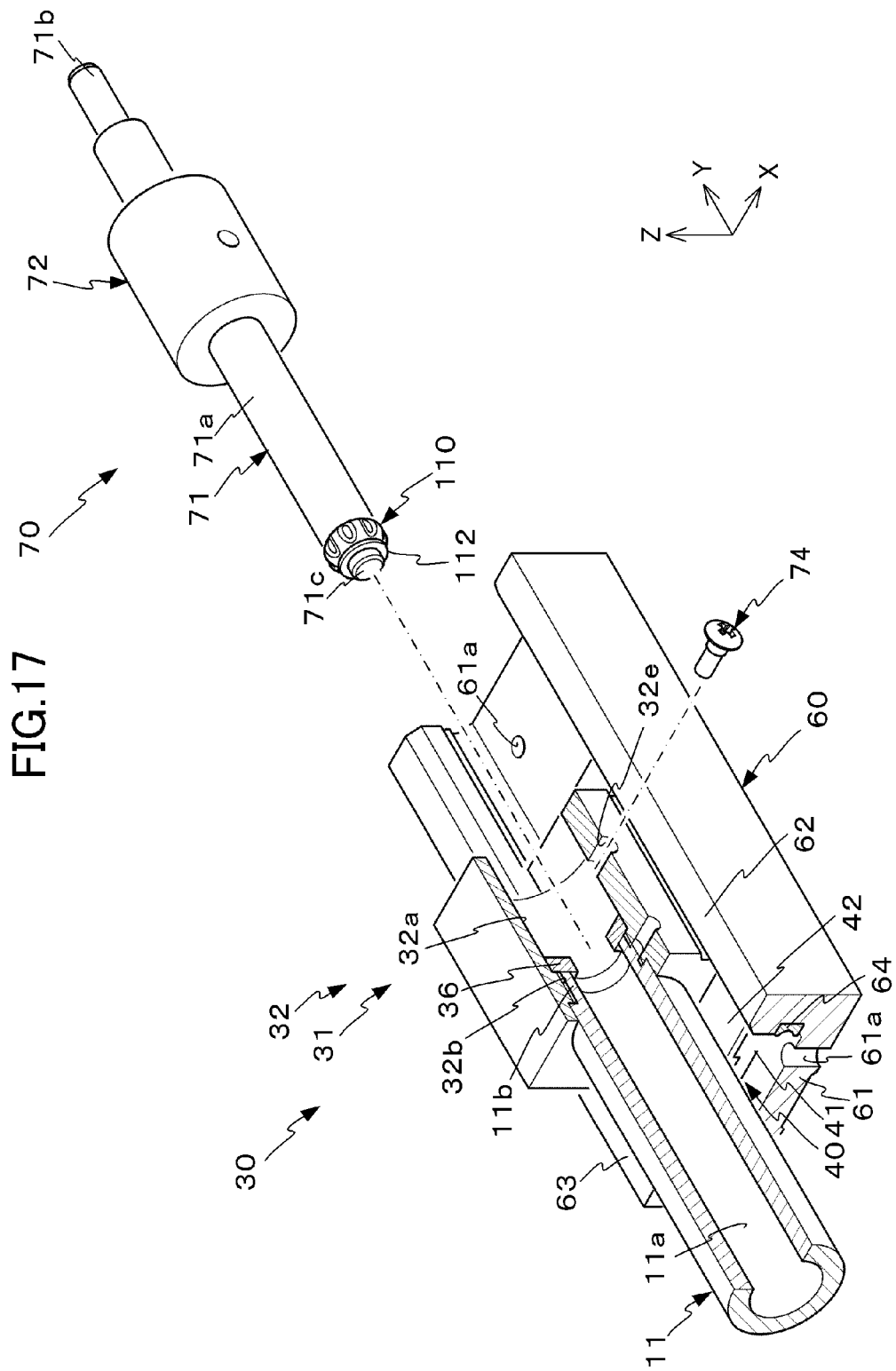
FIG. 17 is a perspective view for explaining how to attach the ball screw to the guide apparatus.

As illustrated in FIG. 17, the ball screw 70 is fastened to the guide apparatus 30. More specifically, the end of the ball screw shaft 71 at the −Y side is fitted in the through-hole 32a of the slider main body 32 from the +Y side, and thus the ball screw nut 72 is disposed in the through-hole 32a. Next, when the bolts 74 fitted in the holes 32e of the slider main body 32 are screwed in and fastened, the ball screw 70 is fastened to the guide apparatus 30.

Figure 18:
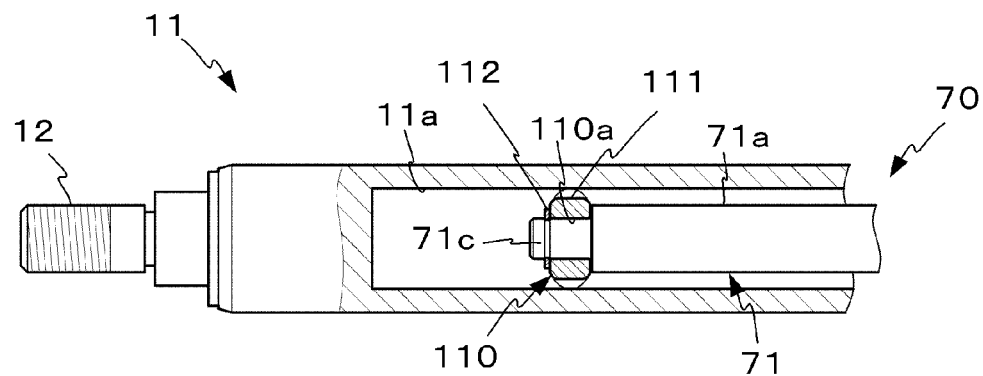
FIG. 18A is a Y-Z cross-sectional view for explaining how to attach the ball screw to the guide apparatus.
FIG. 18B is an X-Z cross-sectional view for explaining how to attach the ball screw to the guide apparatus.
Figure 18:
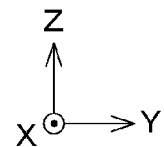
Figure 18:
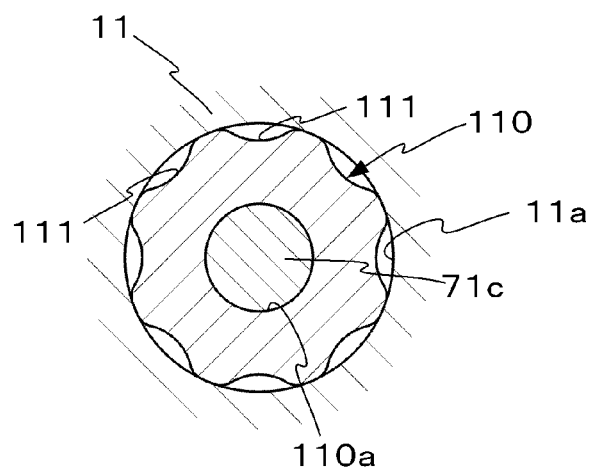
Figure 18:
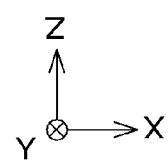

Moreover, when the ball screw 70 is fastened to the guide apparatus 30, as illustrated in FIGS. 18A and 18B, the small diameter portion 71c of the ball screw shaft 71 at the −Y side moves to the interior of the hole 11a of the rod 11. At this time, the outer periphery of the elastic member 110 contacts the inner periphery of the hole 11a of the rod 11. Accordingly, the end of the ball screw shaft 71 at the −Y side is supported by the elastic member 110.

As illustrated in FIG. 3, a front housing 80 is fastened at the −Y side of the guide apparatus 30 by a bolt 81. The front housing 80 is formed by, for example, die-casting. In addition, a through-hole 80a for letting the rod 11 to pass through is formed in the front housing 80, and an oil-less bearing 82 is disposed on the inner periphery of the through-hole 80a. The oil-less bearing 82 supports the rod 11 in a movable manner in the Y-axis direction. Moreover, the front housing 80 has a protrusion 83 that protrudes in the +Y direction, and threaded holes are formed in the upper face (a surface at the +Z side) of the protrusion 83. The threaded holes of the protrusion 83 are utilized to fasten the cover 18. The bolts 19 are fitted in the threaded holes of the protrusion 83 through the through-holes 18a formed in the cover 18.

As illustrated in FIG. 3, the bearing housing 90 is fastened to the +Y side of the guide apparatus 30 by bolts 91. The bearing housing 90 is formed by die-casting likewise the front housing 80. In addition, a through-hole 90a for inserting the ball screw shaft 71 is formed in the bearing housing 90, and a bearing 92 is disposed on the inner periphery of the through-hole 90a. The bearing 92 is fitted in from the +Y side of the through-hole 90a, and is fastened by a bearing holder 92a. This bearing 92 supports the ball screw shaft 71 in a rotatable manner.

Still further, the bearing housing 90 has a protrusion 93 that protrudes in the −Y direction, and threaded holes are formed in the upper face (a surface at the +Z side) of the protrusion 93. The threaded holes are utilized to fasten the cover 18. The bolts 19 are fitted in the threaded holes of the protrusion 93 through the through-holes 18a formed in the cover 18. Moreover, a shock absorber member 94 that contacts the slider 31 moving in the +Y direction and absorbs shock from the slider 31 is disposed on the face of the protrusion 93 at the −Y side. The shock absorber member 94 is formed of an elastic material, and the material of the shock absorber member 94 is an arbitrary resin. In addition, the bearing housing 90 has a protrusion 95 that protrudes in the +Y direction.

Figure 19:
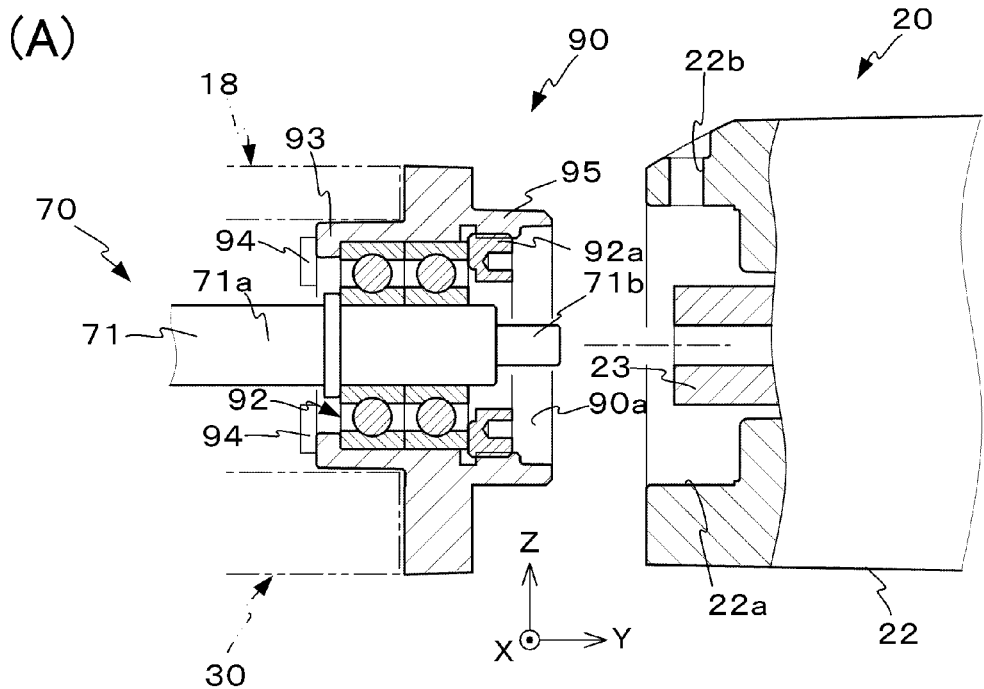
FIG. 19A is a Y-Z cross-sectional view for explaining how to attach the ball screw to a bearing housing.
FIG. 19B is a Y-Z cross-sectional view for explaining how to attach a motor unit to the bearing housing.
Figure 19:
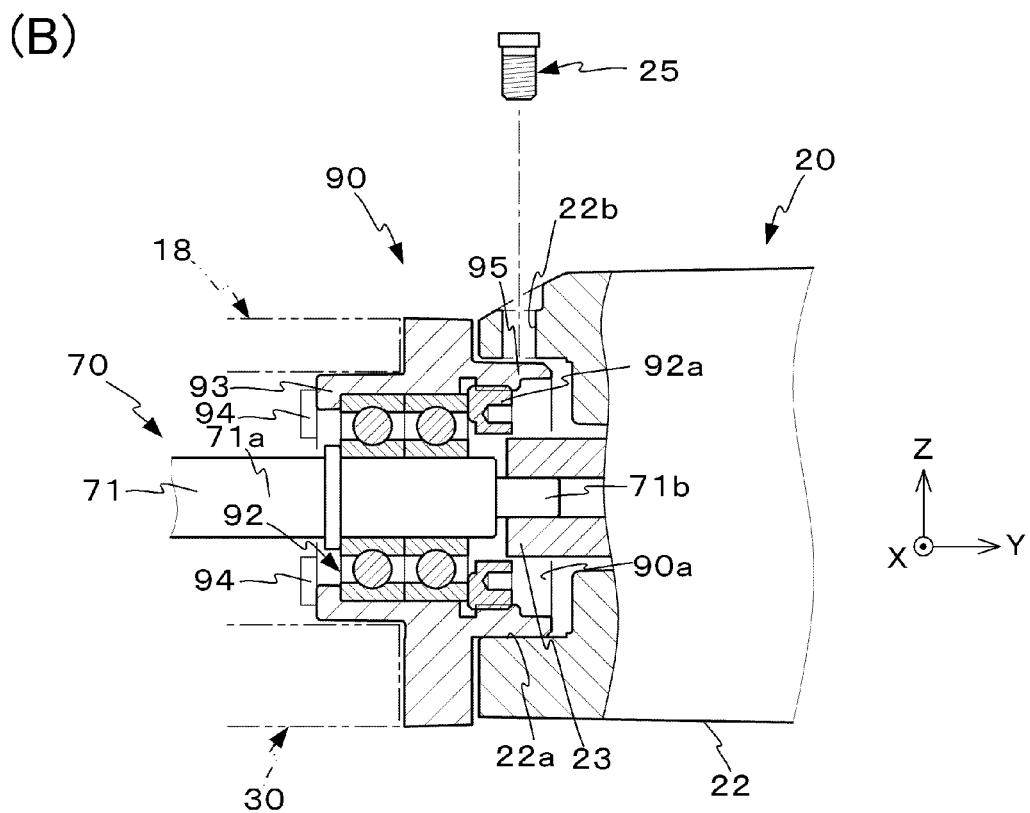

As illustrated in FIG. 19A, the small diameter portion 71b of the ball screw shaft 71 is inserted in the bearing housing 90. Accordingly, the ball screw 70 is supported by the bearing housing 90 in a rotatable manner. In addition, the protrusion 95 of the bearing housing 90 is fitted in the opening 22a of the motor housing 22 of the motor unit 20. At this time, the small diameter portion 71b of the ball screw shaft 71 structured as a coupling is coupled with the output shaft 23 structured as a coupling in such a manner as to rotate together with the rotation of the output shaft 23. Accordingly, the rotation generated in the motor 21 is transmitted to the ball screw shaft 71. Next, as illustrated in FIG. 19B, the bolt 25 is screwed in the threaded hole 22b formed in the motor housing 22. Hence, the upper face (the surface at the +Z side) of the protrusion 95 of the bearing housing 90 is pushed against the lower end of the bolt 25, and thus the motor unit 20 is fastened to the bearing housing 90.

Figure 20:
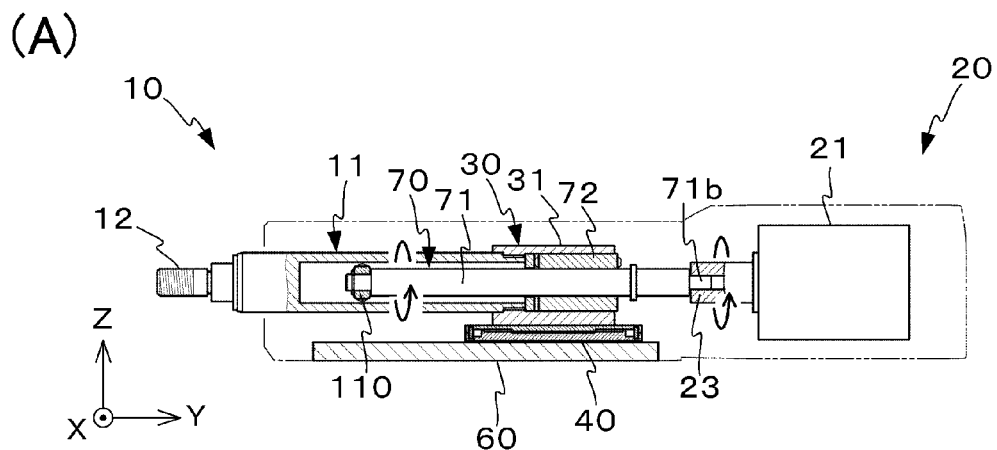
FIG. 20A is a Y-Z cross-sectional view for explaining an operation of an actuator.
FIG. 20B is a Y-Z cross-sectional view for explaining an operation of the actuator.
FIG. 20C is a Y-Z cross-sectional view for explaining an operation of the actuator.
Figure 20:
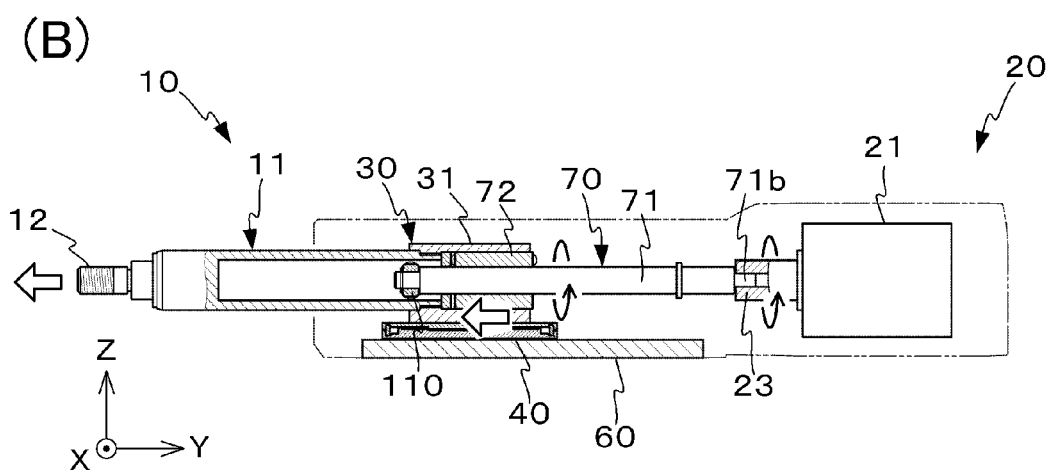
Figure 20:
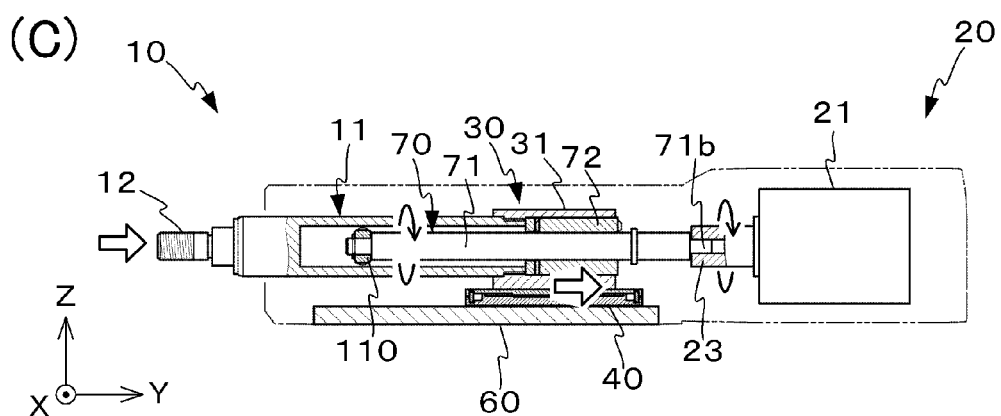
Figure 21:
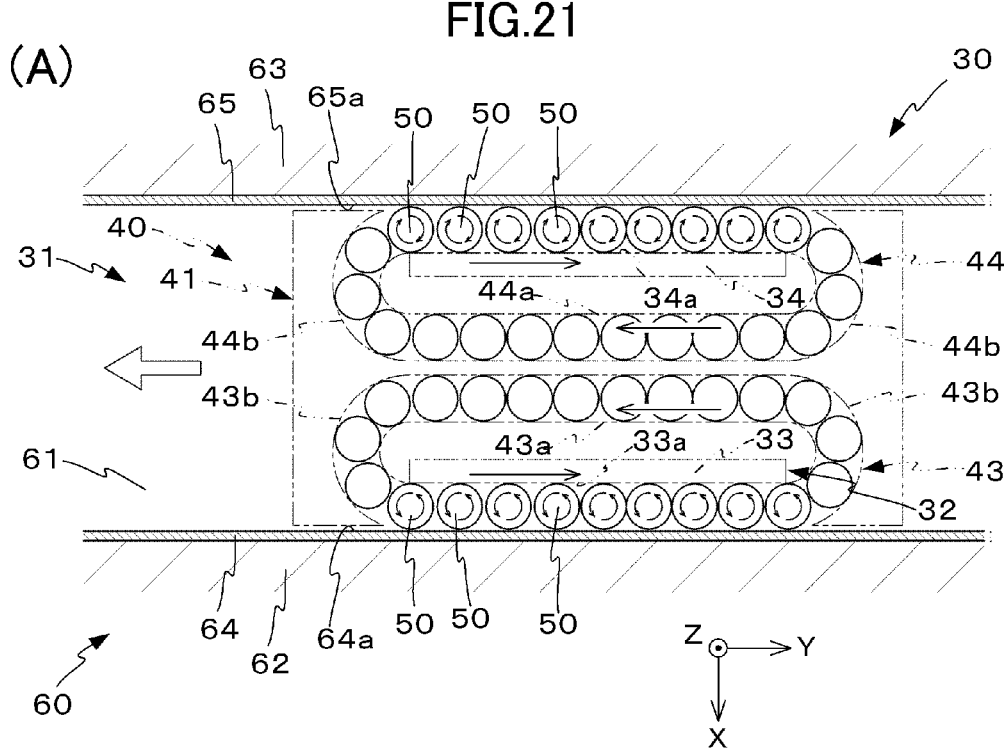
FIG. 21A is an X-Y cross-sectional view for explaining an operation of the guide apparatus.
FIG. 21B is an X-Y cross-sectional view for explaining an operation of the guide apparatus.
Figure 21:
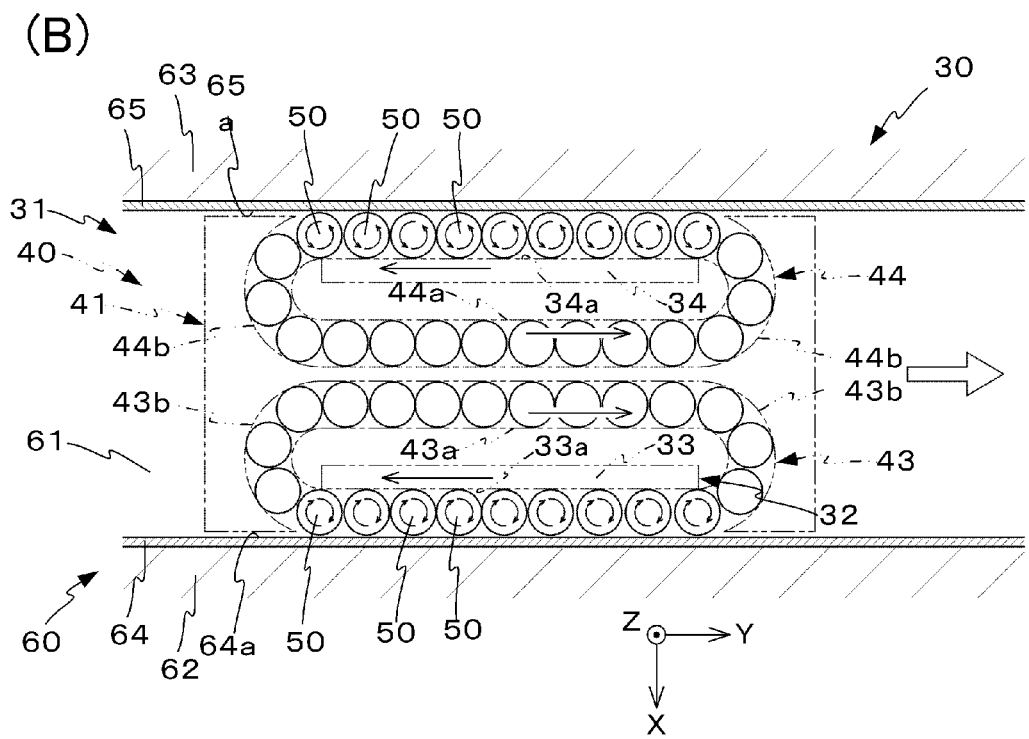
Figure 22:
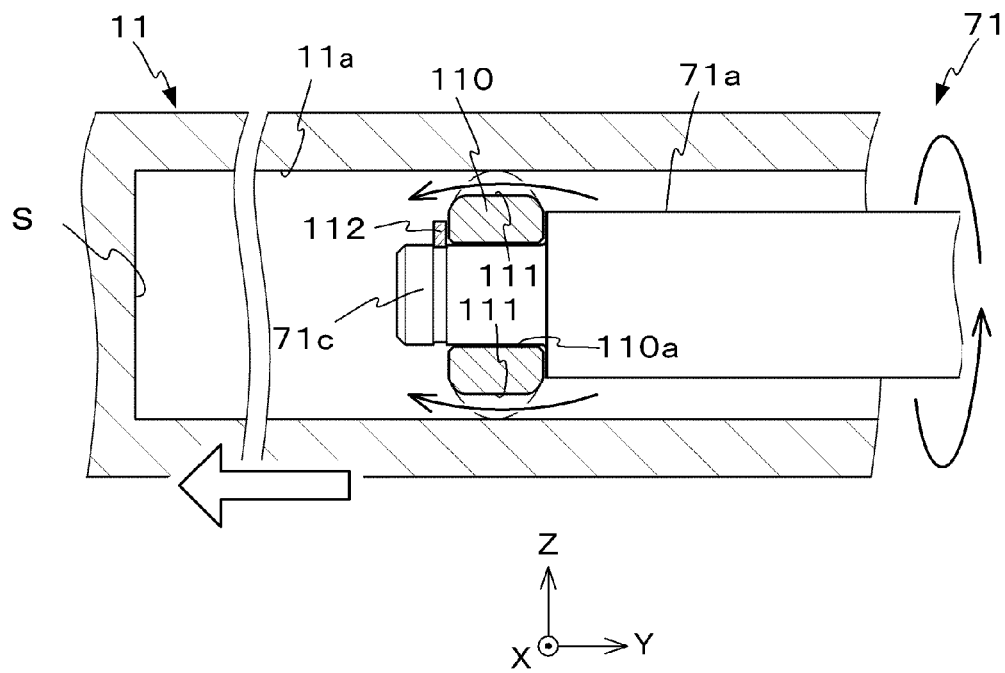
FIG. 22A is a Y-Z cross-sectional view for explaining an action of the elastic member.
FIG. 22B is a Y-Z cross-sectional view for explaining an action of the elastic member.
Figure 22:
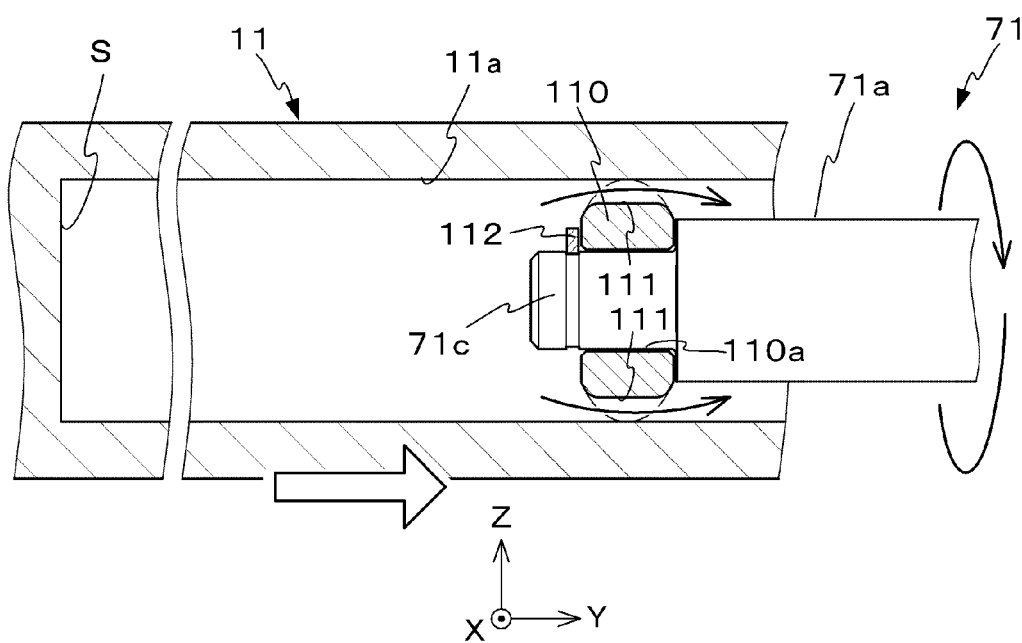

An explanation will be given of an operation of the actuator 10 employing the above-explained structure with reference to FIGS. 20 to 22.

First, when power is supplied to the motor 21 of the motor unit 20, as illustrated in FIG. 20A, the output shaft 23 of the motor 21 rotates in a predetermined direction. When the output shaft 23 rotates in the predetermined direction, the ball screw shaft 71 coupled with the output shaft 23 rotates together with the output shaft 23.

When the ball screw shaft 71 rotates, as illustrated in FIG. 20B, together with the rotation of the ball screw shaft 71, the ball screw nut 72 moves linearly in, for example, the −Y direction. When the ball screw nut 72 moves in the −Y direction, the slider 31 of the guide apparatus 30 fastened to the ball screw nut 72 moves in the −Y direction together with the ball screw nut 72.

At this time, as illustrated in FIG. 21A, the balls 50 disposed between the groove 64a of the steel member 64 of the rail 60 and the groove 33a of the convexity 33 of the slider main body 32 roll while being subjected to rolling contact with the groove 64a and the groove 33a. The balls 50 move in the +Y direction, and move to the ball circulation channel 43 formed in the return 40 from the space between the groove 64a and the groove 33a. The balls 50 that have moved to the ball circulation channel 43 pass through a curved channel 43b of the ball circulation channel 43, the straight channel 43a thereof, and move again to the space between the groove 64a and the groove 33a. Next, the balls 50 roll while being subjected to rolling contact with the groove 64a and the groove 33a.

Likewise, the balls 50 disposed between the groove 65a of the steel member 65 of the rail 60 and the groove 34a of the convexity 34a of the slider main body 32 roll while being subjected to rolling contact with the groove 65a and the groove 34a. The balls 50 move in the +Y direction, and move to the ball circulation channel 44 formed in the return 40 from the space between the groove 65a and the groove 34a. The balls 50 that have moved to the ball circulation channel 44 pass through the curved channel 44b of the ball circulation channel 44, and the straight channel 44a thereof, and move again to the space between the groove 65a and the groove 34a from the ball circulation channel 44. Next, the balls 50 roll while being subjected to rolling contact with the groove 65a and the groove 34a.

When the balls 50 roll while being subjected to rolling contact with the grooves 64a, 65a, and the grooves 33a, 34a, the slider 31 moves in the −Y direction while being guided by the rail 60.

When the slider 31 of the guide apparatus 30 moves in the −Y direction, as illustrated in FIG. 20B, the rod 11 fastened to the slider 31 also moves in the −Y direction together with the slider 31. Accordingly, the leading end attachment 12 attached to the leading end of the rod 11 moves in the −Y direction.

In addition, as illustrated in FIG. 22A, the rod 11 moves in the −Y direction, while the ball screw shaft 71 does not move in the −Y direction but rotates. Hence, the inner periphery of the hole 11a of the rod 11 slides against the elastic member 110 attached to the ball screw shaft 71. At this time, the volume of a space S defined by the hole 11a of the rod 11 and the face of the elastic member 110 at the −Y side becomes large as the rod 11 moves in the −Y direction. Hence, the air in the space S flows in through the grooves 111 of the elastic member 110, thereby maintaining the internal pressure of the space S to be constant.

Through the above actuation, the movement of the rod 11 and the leading end attachment 12 in the −Y direction completes.

Next, when the output shaft 23 of the motor unit 20 rotates in the opposite direction to the predetermined direction, as illustrated in FIG. 20C, the ball shaft screw 71 coupled with the output shaft 23 rotates together with the output shaft 23.

When the ball screw shaft 71 rotates, together with the rotation of the ball screw shaft 71, the ball screw nut 72 linearly moves in the +Y direction. When the ball screw nut 72 moves in the +Y direction, the slider 31 of the guide apparatus 30 fastened to the ball screw nut 72 also moves in the +Y direction together with the ball screw nut 72.

At this time, as illustrated in FIG. 21B, the balls 50 disposed between the grooves 64a, 65a of the steel members 64, 65 of the rail 60 and the grooves 33a, 34a of the convexities 33, 34 of the slider main body 32 roll while being subjected to rolling contact with the grooves 64a, 65a and the grooves 33a, 34a. The balls 50 move in the −Y direction, and then move to the ball circulation channels 43, 44 formed in the return 40. The balls 50 that have moved to the ball circulation channels 43, 44 pass through the curved channels 43b, 44b of the ball circulation channels 43, 44, and the straight channels 43a, 44a, and move again to the spaces between the grooves 64a, 65a and the grooves 33a, 34a. The balls 50 that have moved to the spaces between the grooves 64a, 65a, and the grooves 33a, 34a roll while being subjected to rolling contact.

When the balls 50 roll while being subjected to rolling contact with the grooves 64a, 65a, and the grooves 33a, 34a, the slider 31 moves in the +Y direction while being guided by the rail 60.

When the slider 31 of the guide apparatus 30 moves in the +Y direction, as illustrated in FIG. 20C, the rod 11 fastened to the slider 31 also moves in the +Y direction together with the slider 31. Accordingly, the leading end attachment 12 attached to the leading end of the rod 11 moves in the +Y direction.

In addition, as illustrated in FIG. 22B, the rod 11 moves in the +Y direction, while the ball screw shaft 71 does not move in the +Y direction but rotates. Hence, the space S becomes small as the rod 11 moves in the +Y direction. Accordingly, the air in the space S is flown out from the grooves 111 of the elastic member 110, thereby maintaining the internal pressure of the space S to be constant.

Through the above actuation, the movement of the rod 11 and the leading end attachment 12 in the +Y direction completes, and the rod 11 and the leading end attachment 12 return to the original position.

As explained above, in the actuator 10 of this embodiment, the slider 31 is supported by the steel members 64, 65 of the rail 60 through the balls 50 formed of steel. Accordingly, even if torque originating from the rotation of the output shaft 23 of the motor unit 20 is applied to the slider 31 through the ball screw shaft 71, the slider 31 does not move around the output shaft 23 with respect to the rail 60. Hence, the torque originating from the rotation of the output shaft 23 is not likely to be transmitted to the rod 11 through the guide apparatus 30, and thus it becomes possible for the actuator to suppress an occurrence of the wobbling of the leading end of the rod 11. This suppresses a wobbling of the leading end attachment 12 fastened to the rod 11, thereby preventing a reduction of the work precision of the actuator 10.

In addition, the guide apparatus 30 enables the rod 11 to smoothly and reciprocately move in the Y-axis direction.

Still further, according to this embodiment, the elastic member 110 is attached to the small diameter portion 71c of the ball screw shaft 71. Hence, the end of the ball screw shaft 71 at the −Y side is supported by this elastic member 110 with respect to the inner periphery of the hole 11a of the rod 11. Accordingly, an occurrence of the wobbling of the leading end of the ball screw shaft 71 can be suppressed.

Figure 23:
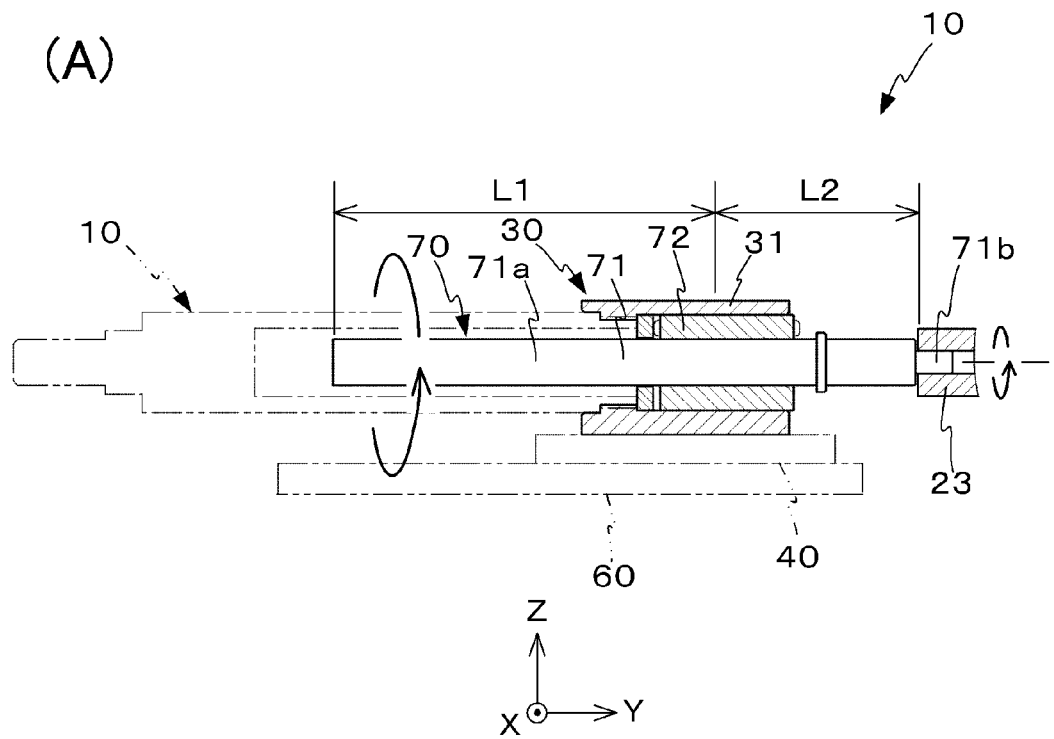
FIG. 23A illustrates a comparative example for explaining an occurrence of a wobbling of the leading end of the ball screw shaft.
FIG. 23B is a cross-sectional view illustrating the actuator according to an embodiment of the present invention for explaining an occurrence of a wobbling of the leading end of the ball screw shaft.
Figure 23:
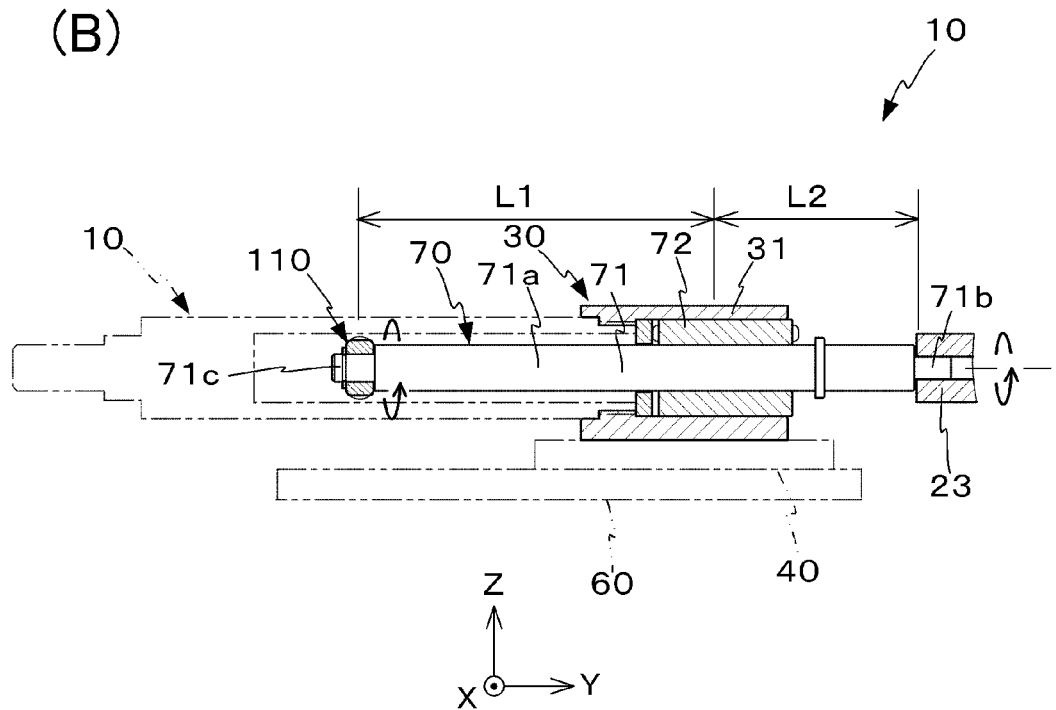

For example, as is clear from FIG. 23A, when no elastic member 110 is attached to the leading end of the ball screw shaft 71, the end of the ball screw shaft 71 at the −Y side is not supported with respect to the inner periphery of the hole 11a of the rod 11, and thus a wobbling of the leading end of the ball screw shaft 71 is likely to occur. In particular, when the ball screw nut 72 is moved in the +Y direction greatly, a distance L1 between the ball screw nut 72 to the leading end of the ball screw shaft 71 becomes large with respect to a distance L2 between the ball screw nut 72 to the output shaft 23, which may cause a large wobbling.

Conversely, according to this embodiment, as is clear from FIG. 23B, the end of the ball screw shaft 71 at the −Y side is supported by the elastic member 110. Accordingly, even if the ball screw nut 72 is moved in the +Y direction greatly, an occurrence of the wobbling of the leading end of the ball screw shaft 71 can be suppressed. Hence, an occurrence of the wobbling of the leading end of the rod 11 originating from the wobbling of the leading end of the ball screw shaft 71 can be suppressed, thereby preventing a reduction of the work precision of the actuator 10.

Moreover, the elastic member 110 is formed with the grooves 111, and thus a change in the internal pressure of the space S when the rod 11 moves is avoidable. When, for example, no groove 111 is formed in the elastic member 110, the space S becomes a sealed space defined by the hole 11a of the rod 11 and the face of the elastic member 110 at the −Y side. Accordingly, together with the movement of the rod 11 in the Y-axis direction, the internal pressure of the space S is changed, disturbing the smooth motion of the rod 11.

In contrast, the elastic member 110 of this embodiment is formed with the grooves 111. Accordingly, the air in the space S flows through the grooves 111 of the elastic member 110, maintaining the internal pressure of the space S to be constant. This eliminates an adverse effect to the motion of the rod 11 due to a change in the internal pressure of the space S. Therefore, a reduction of the work precision of the actuator 10 becomes preventable.

Still further, the multiple grooves 111 are formed at an equal interval along the circumference around the center of the ball screw shaft 71. Accordingly, the contact area between the hole 11a of the rod 11 and the elastic member 110 is reduced. This reduces a frictional coefficient of the rod 11 relative to the elastic member 110, thereby reducing an adverse effect to the motion of the rod 11 due to a friction between the rod 11 and the elastic member 110. Therefore, a reduction of the work precision of the actuator 10 becomes preventable.

Figure 24:
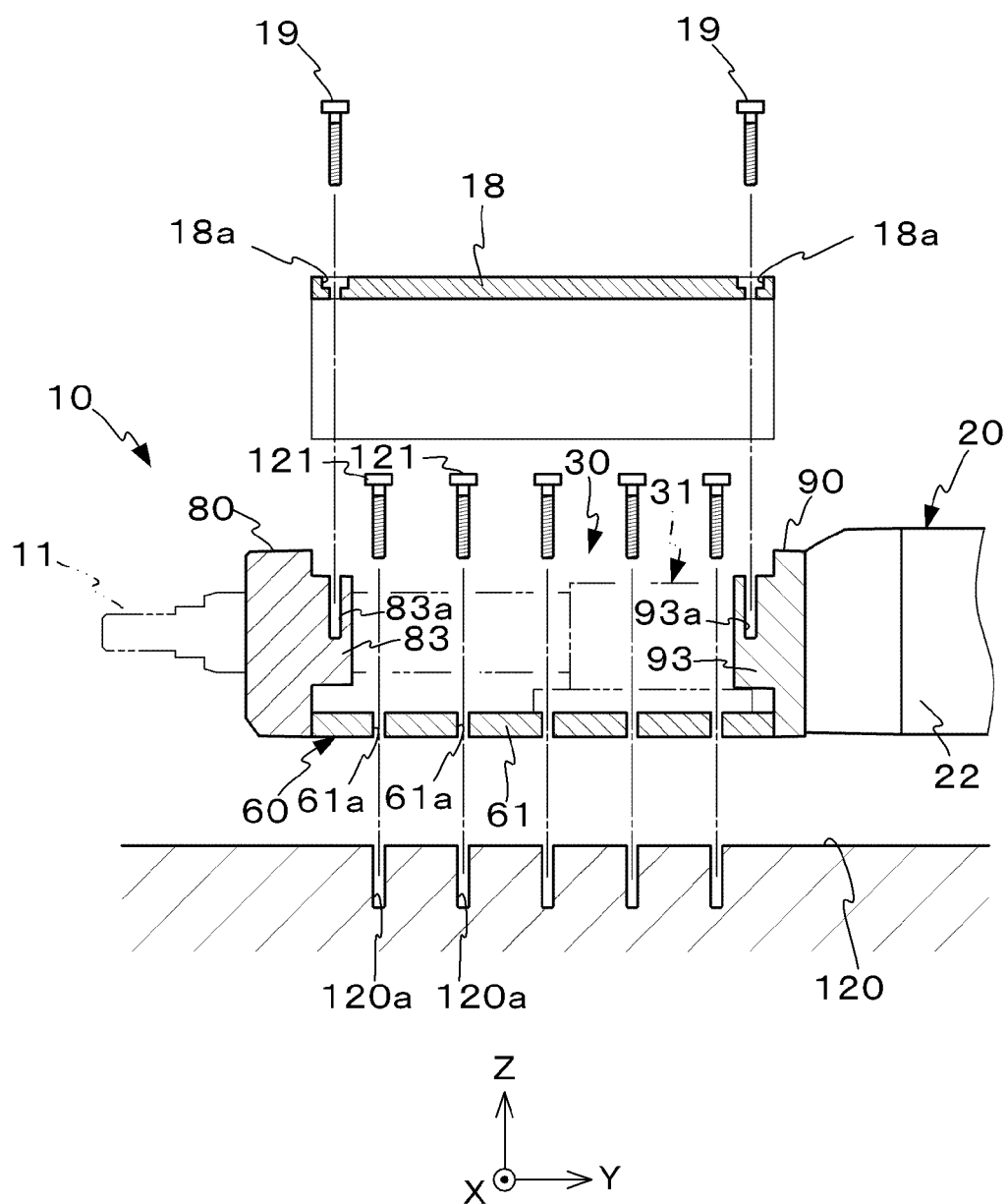
FIG. 24 is a diagram for explaining how to attach the actuator to a workbench.

Moreover, the actuator 10 has the cover 18. Accordingly, when the cover 18 is detached, it becomes possible to fasten the actuator by bolts from the upper space (+Z side) of the actuator 10. More specifically, as illustrated in FIG. 24, when it is attempted to fasten the actuator 10 to a work bench 120, by detaching the cover 18, bolts 121 are insertable in threaded holes 120a of the work bench 120 through the through-holes 61a formed in the base 61 of the rail 60 from the upper space (+Z side) of the actuator 10. This facilitates an attachment of the actuator 10 to the work bench 120.

In contrast, in the case of an actuator having no cover, when such an actuator is fastened to a work bench, it is necessary for a worker to go under the work bench and to attach the actuator from the lower space (−Z side). According to the actuator 10 of this embodiment, however, the actuator is attachable to the work bench 120 from the upper space (+Z side), and thus the workability for attaching the actuator 10 is improved.

Furthermore, as explained above, the actuator 10 has the cover 18. Hence, when the cover 18 is detached, grease for the balls 50 can be filled through the grease service hole 48 from the upper space (+Z side) formed in the return 40 of the guide apparatus 30. In contrast, in the case of the actuator having no cover, in order to fill grease for the balls 50, it is necessary to disassemble the casing and the like, and thus a grease filling work takes a time. According to the actuator 10 of this embodiment, however, by detaching the cover 18, grease can be filled through the grease service hole 48 from the upper space (+Z side), resulting in an excellent workability of a grease filling work.

Still further, the rod 11 is fastened to the slider 31 of the guide apparatus 30 by screwing. Hence, in comparison with fastening by bolts or the like, the rod is firmly fastened, and it becomes unnecessary to prepare separate parts like bolts.

The embodiment of the present invention was explained above, but the present invention is not limited to the above-explained embodiment and the like.

Figure 25:
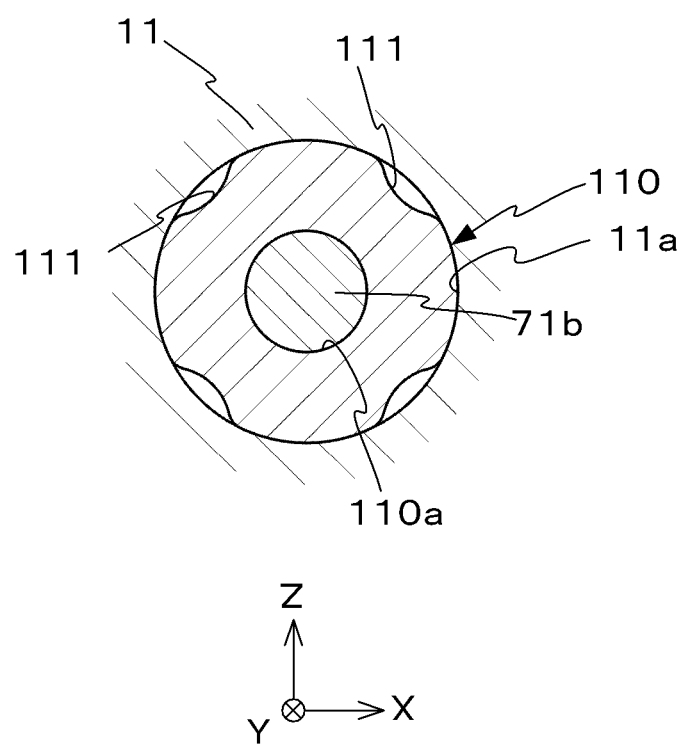
FIG. 25 is an X-Z cross-sectional view illustrating a modified example of the elastic member.

For example, in the above-explained embodiment, the elastic member 110 has eight grooves 111, but the number of grooves is not limited to this case. As illustrated in FIG. 25, four grooves 111 may be formed. Moreover, a solo groove 111 may be formed, or greater than eight grooves 111 may be formed.

Moreover, the multiple balls 50 are disposed between the slider 31 of the guide apparatus 30 and the return 40, but the present invention is not limited to this case. Rolling elements (rollers) may be disposed therebetween.

The rod 11 is fastened to the slider 31 by screwing, but the present invention is not limited to this case. The rod may be fastened by bolts or the like.

The grooves 64a, 65a are formed in the steel members 64, 65 of the rail 60, but grooves may be directly formed in the side walls 62, 63 of the rail 60.

First Modified Example

Figure 26:
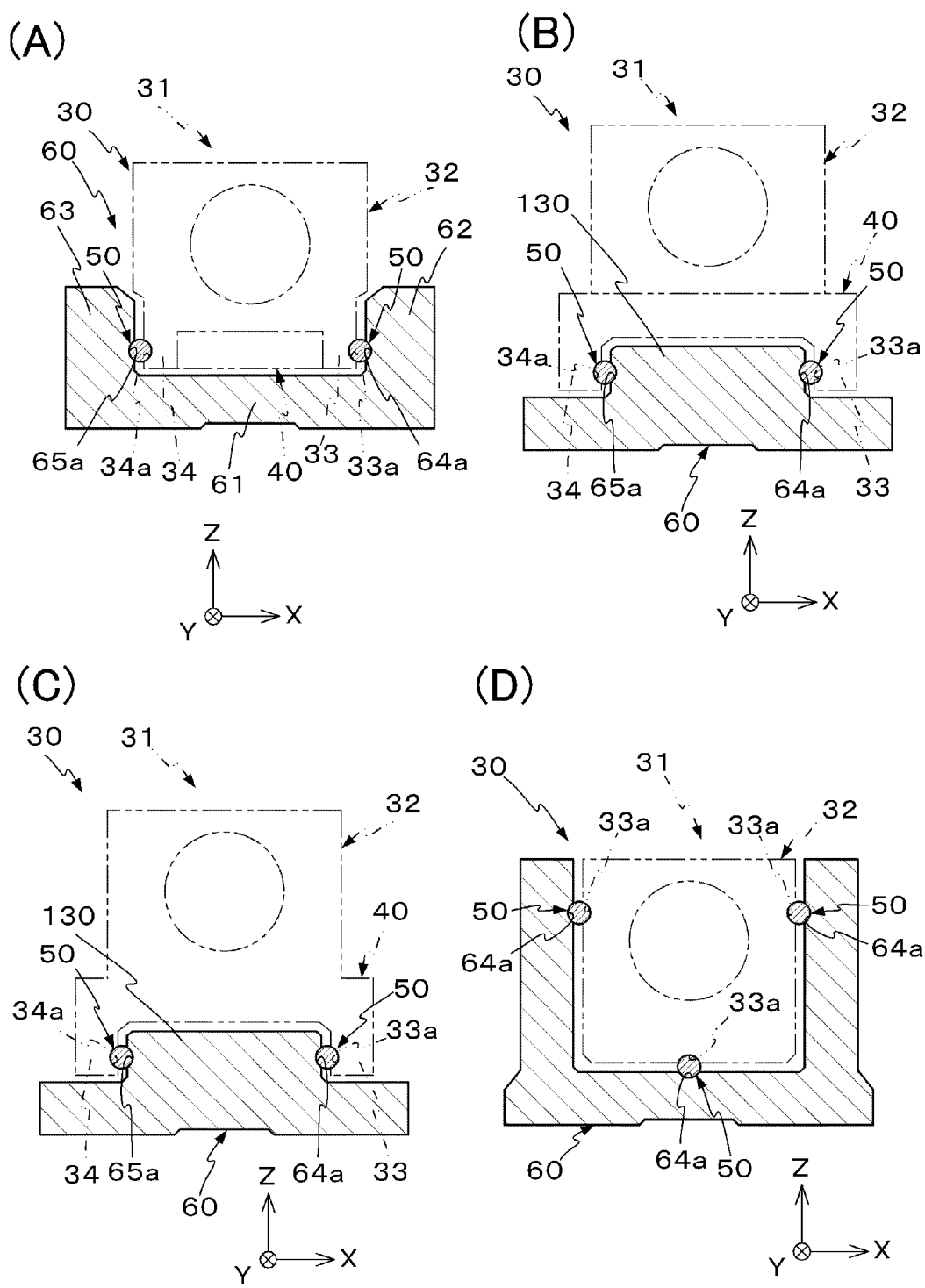
FIG. 26A is a (first) X-Z cross-sectional view illustrating a guide apparatus according to a first modified example.
FIG. 26B is a (second) X-Z cross-sectional view illustrating the guide apparatus according to the first modified example.
FIG. 26C is a (third) X-Z cross-sectional view illustrating the guide apparatus according to the first modified example.
FIG. 26D is a (fourth) X-Z cross-sectional view illustrating the guide apparatus according to the first modified example.

In the above-explained embodiment illustrated in FIGS. 1 to 24, the steel members 64, 65 are attached to the grooves 62, 63 of the rail 60. The present invention is, however, not limited to this case, and as illustrated in FIG. 26A, the steel members 64, 65 may be formed integrally with the rail 60 of the guide apparatus 30. In this case, the grooves 64a, 65a where the balls 50 roll are directly formed in the side walls 62, 63 of the rail 60. According to such a case, like the above-explained embodiment, torque originating from the rotation of the output shaft 23 is not likely to be transmitted to the rod 11 through the guide apparatus 30, and thus an occurrence of the wobbling of the leading end of the rod 11 becomes preventable.

According to the modified example illustrated in FIG. 26A, the slider 31 is fitted between the side wall 62 of the rail 60 and the side wall 63 thereof, thereby being attached to the rail 60. However, the present invention is not limited to this structure. According to a modified example illustrated in FIG. 26B, instead of the side walls 62, 63, a linear convexity 130 along the Y-axis direction is formed on the rail 60. This convexity 130 is fitted between the convexity 33 of the slider main body 32 and the convexity 34 thereof, and thus the slider 31 may be attached to the rail 60.

In addition, in FIGS. 26A and 26B, the slider main body 32 and the return 40 are formed as separate pieces. The present invention is, however, not limited to this structure, and as illustrated in FIG. 26C, the slider main body 32 and the return 40 may be formed integrally.

In the above-explained embodiment illustrated in FIGS. 1 to 24 and the modified examples illustrated in FIGS. 26A to 26C, the grooves 33a, 34a, 64a, and 65a for letting the balls 50 to roll are formed for each of the slider main body 32 and the rail 60 two by two. Hence, the balls 50 roll along the two raceways (raceways T1 and T2 in FIG. 10). The present invention is, however, not limited to this structure, and as illustrated in FIG. 26D, the balls 50 may roll along the three raceways. When the number of raceways where the balls 50 roll increases, an occurrence of the wobbling of the leading end of the rod 11 can be further efficiently suppressed. The number of raceways where the balls 50 roll may be equal to or greater than four.

Figure 27:
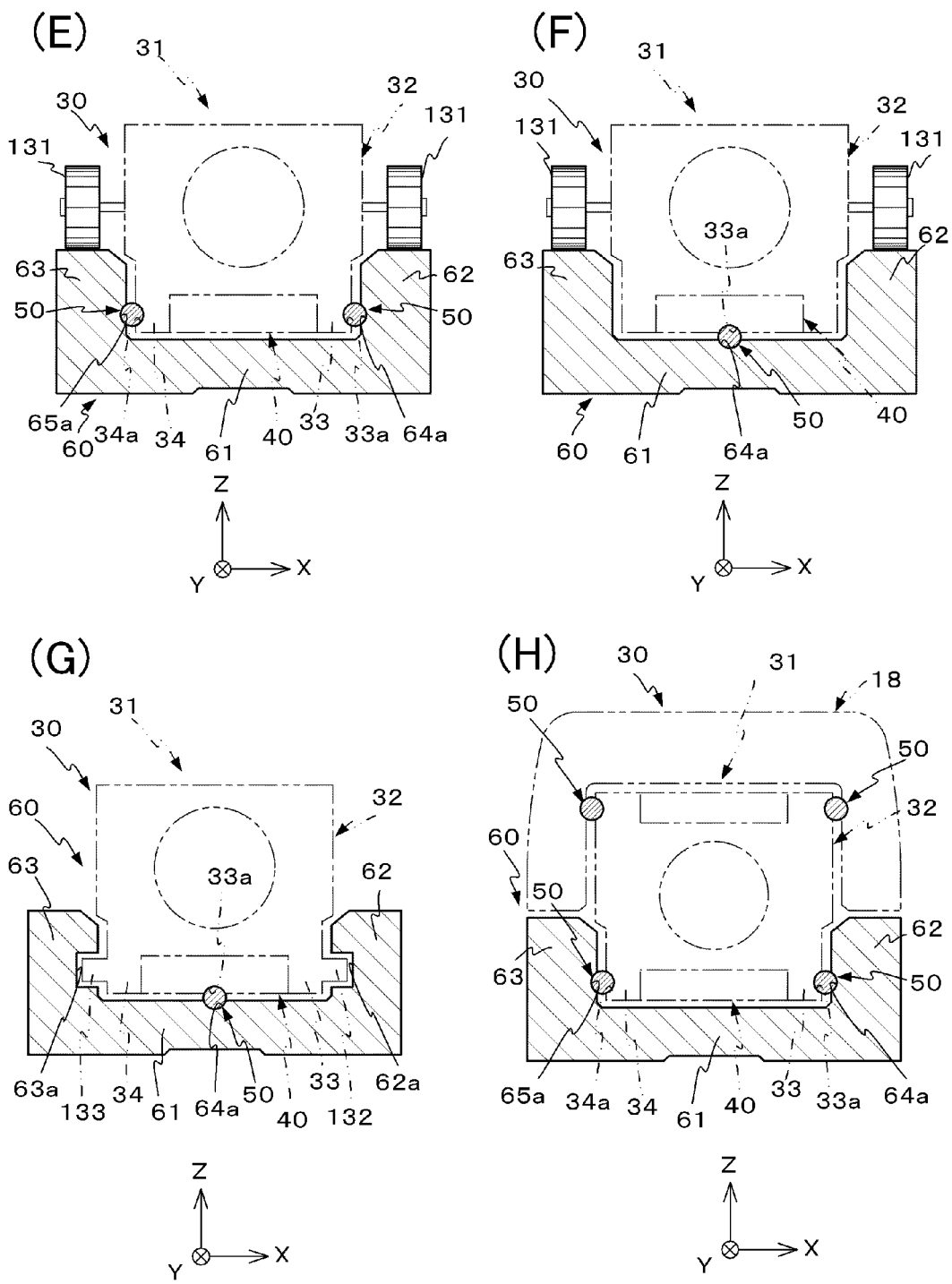
FIG. 27E is a (fifth) X-Z cross-sectional view illustrating the guide apparatus according to the first modified example.
FIG. 27F is a (sixth) X-Z cross-sectional view illustrating the guide apparatus according to the first modified example.
FIG. 27G is a (seventh) X-Z cross-sectional view illustrating the guide apparatus according to the first modified example.
FIG. 27H is an (eighth) X-Z cross-sectional view illustrating the guide apparatus according to the first modified example.

As illustrated in FIG. 27E, the guide apparatus 30 may include rollers 131 that roll over the rail 61 together with a linear motion of the slider 31. This stabilizes the linear motion of the slider 31 in the Y-axis direction, resulting in a suppression of an occurrence of the wobbling of the leading end of the rod 11. In this case, moreover, as illustrated in FIG. 27F, the number of raceways where the balls 50 roll can be reduced to only one.

According to a modified example illustrated in FIG. 27G, a linear protrusion 132 along the Y-axis direction is formed on a face of the convexity 33 of the slider main body 32 at the +X side, and a linear protrusion 133 along the Y-axis direction is formed on a face of the convexity 34 of the slider main body 32 at the −X side. Those protrusions 132, 133 are fitted in the recesses 62a, 63a in a slidable manner. In this case, the number of raceways where the balls 50 roll can be reduced to only one.

According to the embodiment illustrated in FIGS. 1 to 24 and the above-explained modified examples, the grooves 33a, 34a, 64a, and 65a for letting the balls 50 to roll are formed in the slider main body 32 and the rail 61. The present invention is, however, not limited to this structure, and as illustrated in FIG. 27H, grooves for letting the balls 50 to roll may be formed in the cover 18.

Figure 28:
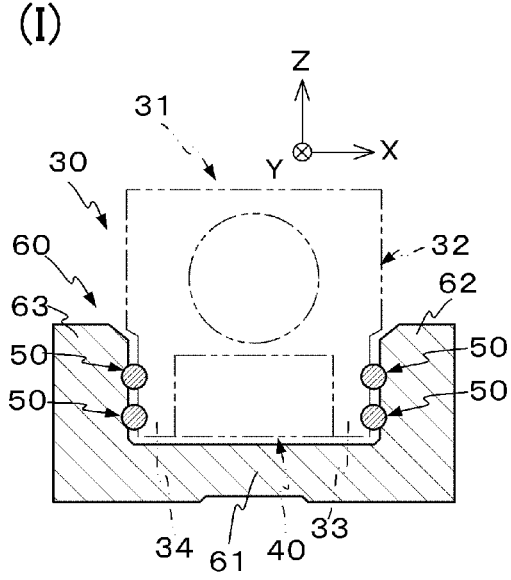
FIG. 28I is a (ninth) X-Z cross-sectional view illustrating the guide apparatus according to the first modified example.
FIG. 28J is a (tenth) X-Z cross-sectional view illustrating the guide apparatus according to the first modified example.
FIG. 28K is a (11th) X-Z cross-sectional view illustrating the guide apparatus according to the first modified example.
FIG. 28L is a (12th) X-Z cross-sectional view illustrating the guide apparatus according to the first modified example.
Figure 28:
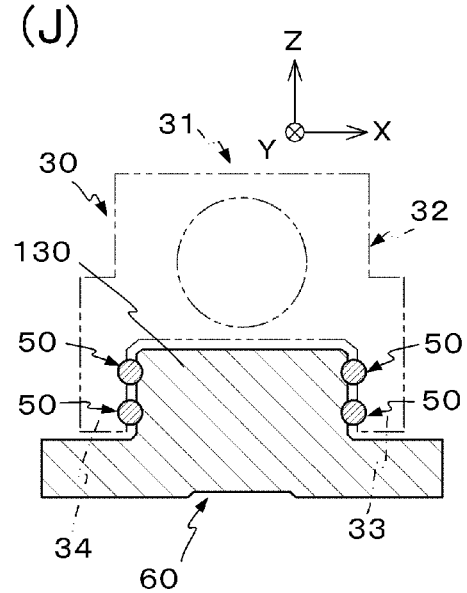
Figure 28:
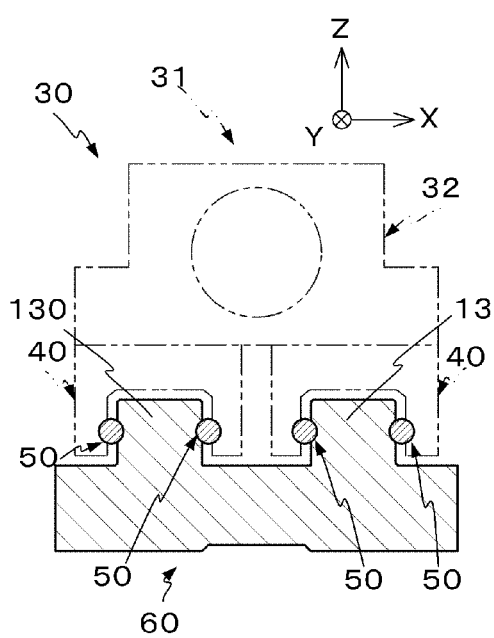
Figure 28:
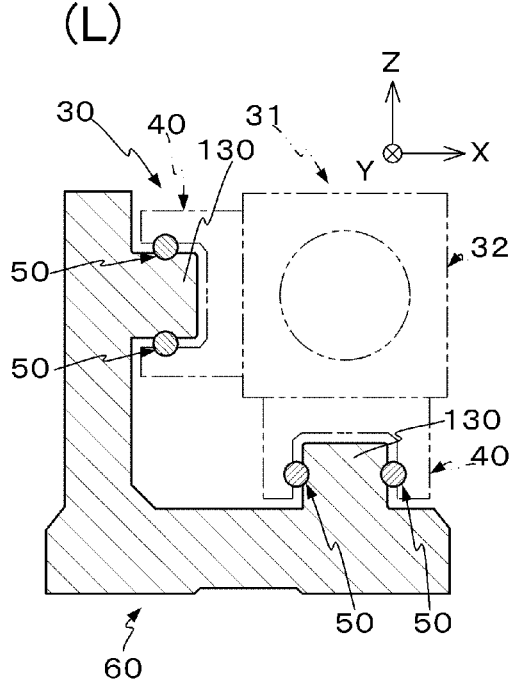

In the above-explained embodiment illustrated in FIGS. 1 to 24 and the modified example illustrated in FIG. 26A, raceways where the balls 50 roll are formed at the +X side of the slider main body 32 and at the −X side thereof, respectively. The present invention is, however, not limited to this structure, and as illustrated in FIG. 28I, two raceways where the balls 50 roll may be formed at each of the +X side of the slider main body 32 and at the −X side thereof. When two raceways where the balls 50 roll are formed at each side, an occurrence of the wobbling of the leading end of the rod 11 can be further effectively suppressed.

According to the modified example illustrated in FIG. 28I, the slider 31 is fitted between the side wall 62 of the rail 60 and the side wall 63 thereof, thereby being attached to the rail 60. The present invention is, however, not limited to this structure, and as illustrated in FIG. 28J, a convexity 130 formed on the rail 60 may be fitted between the convexity 33 of the slider main body 32 and the convexity 34 thereof to attach the slider 31 to the rail 60. In addition, in FIGS. 28I and 28J, two raceways where the balls 50 roll are formed at each of the +X side of the slider main body 32 and at the −X side thereof, but equal to or greater than three raceways may be formed.

In addition, according to a slider 30 of a modified example illustrated in FIG. 26B, one return 40 is provided. The present invention is, however, not limited to this structure, and as illustrated in FIG. 28K, two returns 40 may be provided. Still further, the slider 30 may have equal to or greater than three returns 40.

According to a modified example illustrated in FIG. 28K, the two returns 40 are both fastened to the lower face (the surface at the −Z side) of the slider main body 32, but the present invention is not limited to this structure. For example, as illustrated in FIG. 28L, the returns may be fastened to the lower face (the surface at the −Z side) of the slider main body 32 and a side face (the surface at the −X side) thereof.

In addition, according to the above-explained embodiment and the like, the internal face of the groove where the balls 50 roll is formed in a Gothic arch shape as illustrated in FIGS. 7A, 12A, 13B, and 13C. The present invention is, however, not limited to this case, and the internal face of such a groove may be formed in, for example, a circular shape having a larger curvature radius than the curvature radius of a rolling element like the balls.

Second Modified Example

In the above-explained embodiment illustrated in FIGS. 1 to 24, the guide apparatus 30 has one slider 31, but the number of sliders 31 is optional. An explanation will be given of a second modified example employing two sliders 31 with reference to FIGS. 29A and 29B.

Figure 29:
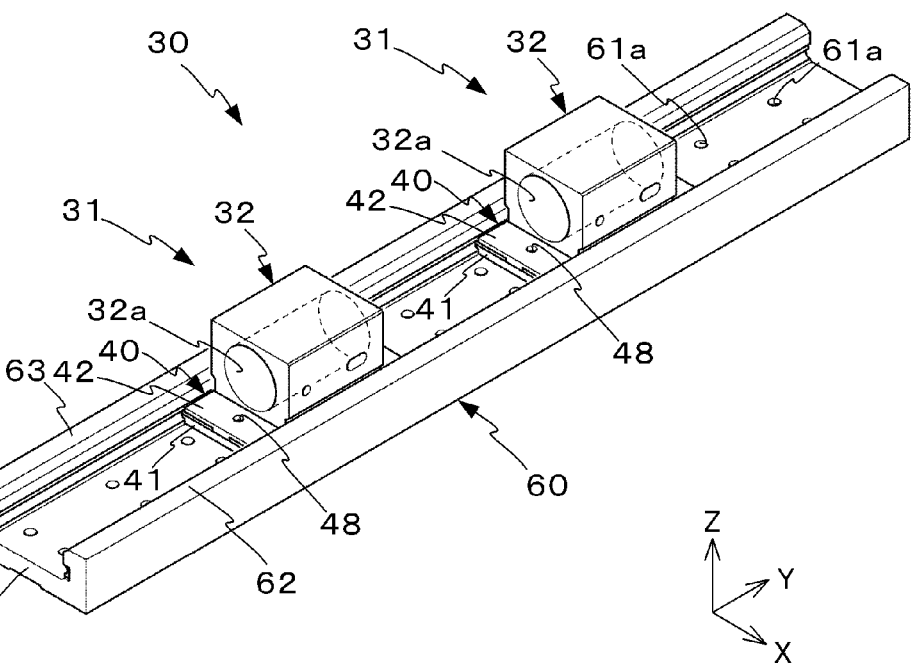
FIG. 29A is a perspective view illustrating a guide apparatus according to a second modified example.
FIG. 29B is a perspective view illustrating an actuator according to the second modified example.
Figure 29:
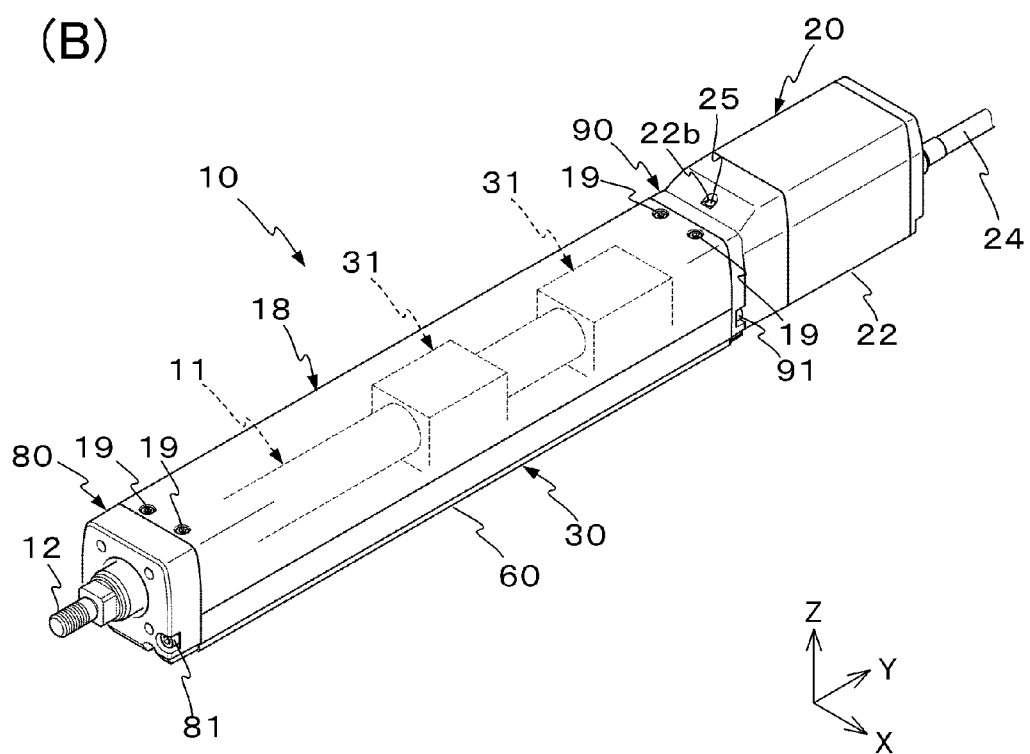

According to the guide apparatus 30 of the second modified example, as illustrated in FIG. 29A, two sliders 31 are attached to the rail 60. As illustrated in FIG. 29B, the rod 11 is fastened across the two sliders 31.

Hence, torque originating from the rotation of the output shaft of the motor unit 20 is less likely to be transmitted to the rod 11 through the guide apparatus 30 than the above-explained embodiment (the embodiment illustrated in FIGS. 1 to 24), and thus an occurrence of the wobbling of the leading end of the rod 11 is suppressed. Therefore, a wobbling of the leading end attachment 12 fastened to the rod 11 can be suppressed, thereby suppressing a reduction of the work precision of the actuator 10.

In addition, the two sliders 31 are attached to the rail 60, and thus the rod 11 is capable of further smoothly and stably reciprocating in the Y-axis direction.

In the second modified example, the two sliders 31 are attached to the rail 60, but the present invention is not limited to this structure, and equal to or greater than three sliders may be attached.

Third Modified Example

Figure 30:
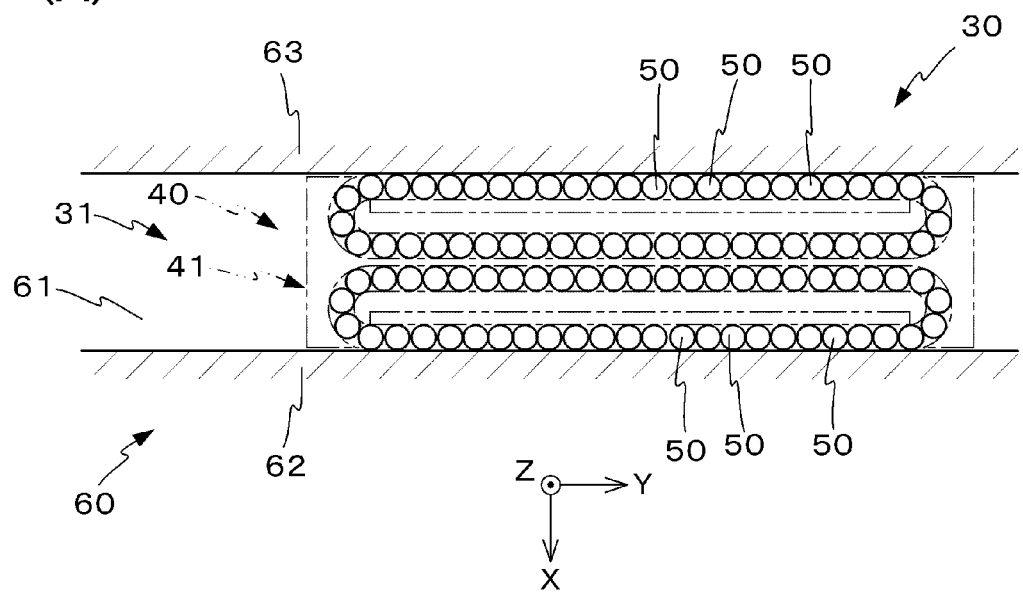
FIG. 30A is an X-Y cross-sectional view illustrating a slider and the like according to a third modified example.
FIG. 30B is a perspective view illustrating an actuator according to the third modified example.
Figure 30:
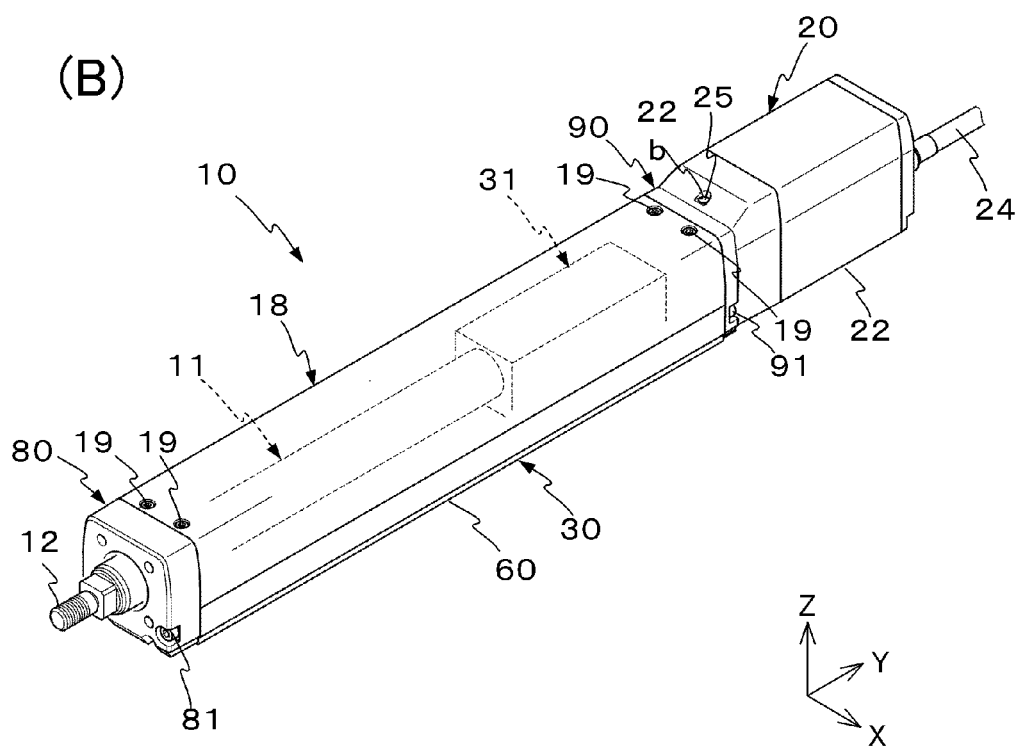

According to the guide apparatus 30 and actuator 10 of a third modified example, as illustrated in FIGS. 30A and 30B, the slider 31 is formed so as to be longer in the Y-axis direction than that of the above-explained embodiment (the embodiment illustrated in FIGS. 1 to 24). Hence, when the rod 11 is fastened to the slider 31, torque originating from the rotation of the output shaft of the motor unit 20 is less likely to be transmitted to the rod 11 through the guide apparatus 30 than the above-explained embodiment. This results in a suppression of an occurrence of the wobbling of the leading end of the rod 11.

In addition, since the slider 31 is formed so as to be long in the Y-axis direction, the rod 11 is capable of further smoothly and stably reciprocating in the Y-axis direction.

Still further, in addition to the elongation of the slider 31 in the Y-axis direction, when the diameter of each ball 50 disposed between the slider 31 and the rail 60 is increased, torque originating from the rotation of the output shaft of the motor unit 20 is not likely to be transmitted to the rod 11 through the guide apparatus 30. This results in a suppression of an occurrence of the wobbling of the leading end of the rod 11. Moreover, the rod 11 is capable of further smoothly and stably reciprocating in the Y-axis direction.

Fourth Modified Example

Figure 31:
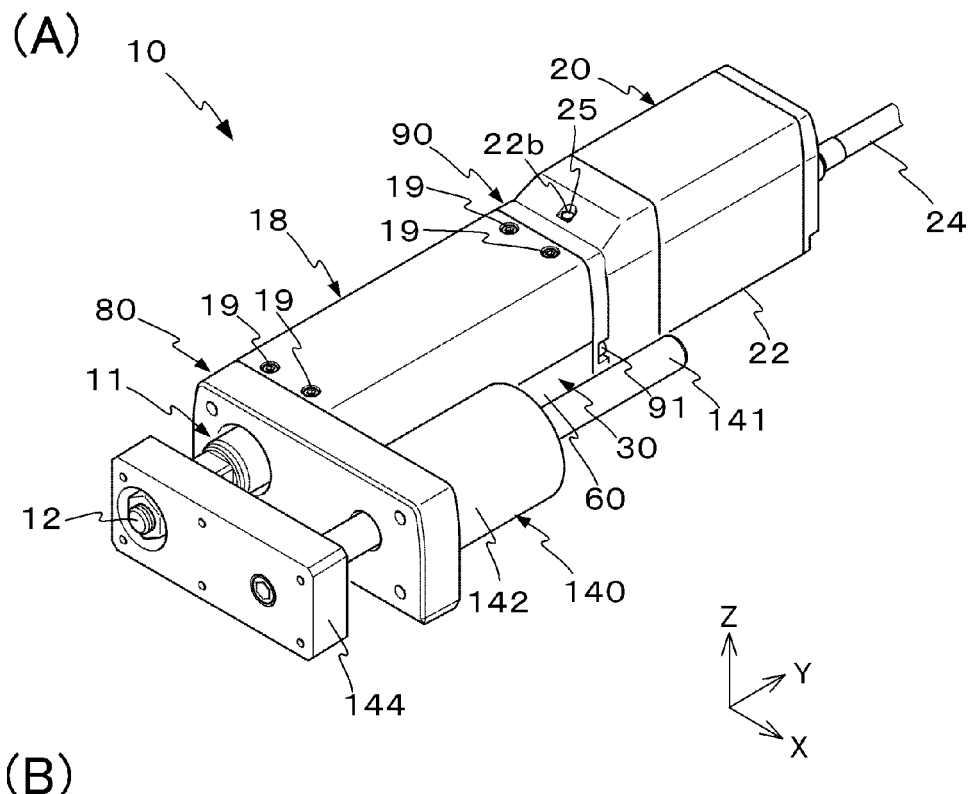
FIG. 31A is a perspective view illustrating an actuator according to a fourth modified example.
FIG. 31B is an X-Y cross-sectional view illustrating a ball bushing and the like according to the fourth modified example.
Figure 31:
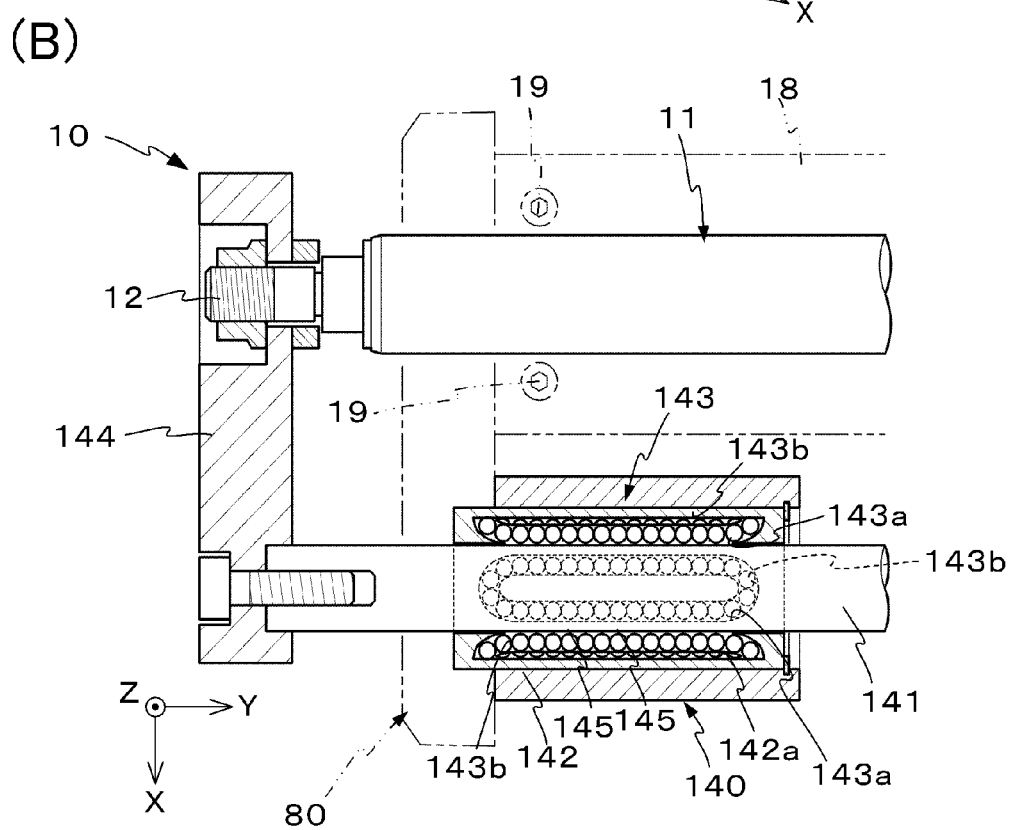

As illustrated in FIGS. 31A and 31B, the actuator 10 of a fourth modified example includes a guide rod unit 140. The guide rod unit 140 includes a guide rod 141, a bushing housing 142, a ball bushing 143, and a linkage 144.

The guide rod 141 moves in the Y-axis direction together with the rod 11 that is a work shaft, thereby guiding the rod 11. The guide rod 141 is supported by the ball bushing 143 in a manner movable in the Y-axis direction. In addition, an end of the guide rod 141 at the −Y side is linked with a work shaft 12 of the rod 11 by the linkage 144. The end of the guide rod 141 at the −Y side is fastened to the linkage 144 by, for example, a bolt. The work shaft 12 of the rod 11 is fastened to the linkage 144 by, for example, a nut.

The bushing housing 142 is fastened to the front housing 80. A through-hole 142a is formed in the bushing housing 142, and the ball bushing 143 is fitted in this through-hole 142a. The ball bushing 143 is prevented from being pulled out from the bushing housing 142 by, for example, a ring formed in a C-shape.

The ball bushing 143 is a member that smoothly moves the guide rod 141 upon rolling of balls 145 disposed in the interior. The ball bushing 143 is formed in a substantially cylindrical shape formed therein a through-hole. Multiple slits 143a are formed in the inner periphery of this through-hole along the Y-axis direction. The balls 145 are disposed in the slits 143a. The balls 145 disposed in the slits 143a are held between the inner periphery of the slit 143a and the outer periphery of the guide rod 141, thereby being rolled together with the movement of the guide rod 141. In addition, a ball circulation channel 143b is formed in the ball bushing 143. The balls 145 rolling a space between the inner periphery of the slit 143a and the outer periphery of the guide rod 141 pass through this ball circulation channel 143b, thereby moving again to the space between the inner periphery of the slit 143a and the outer periphery of the guide rod 141.

Figure 32:
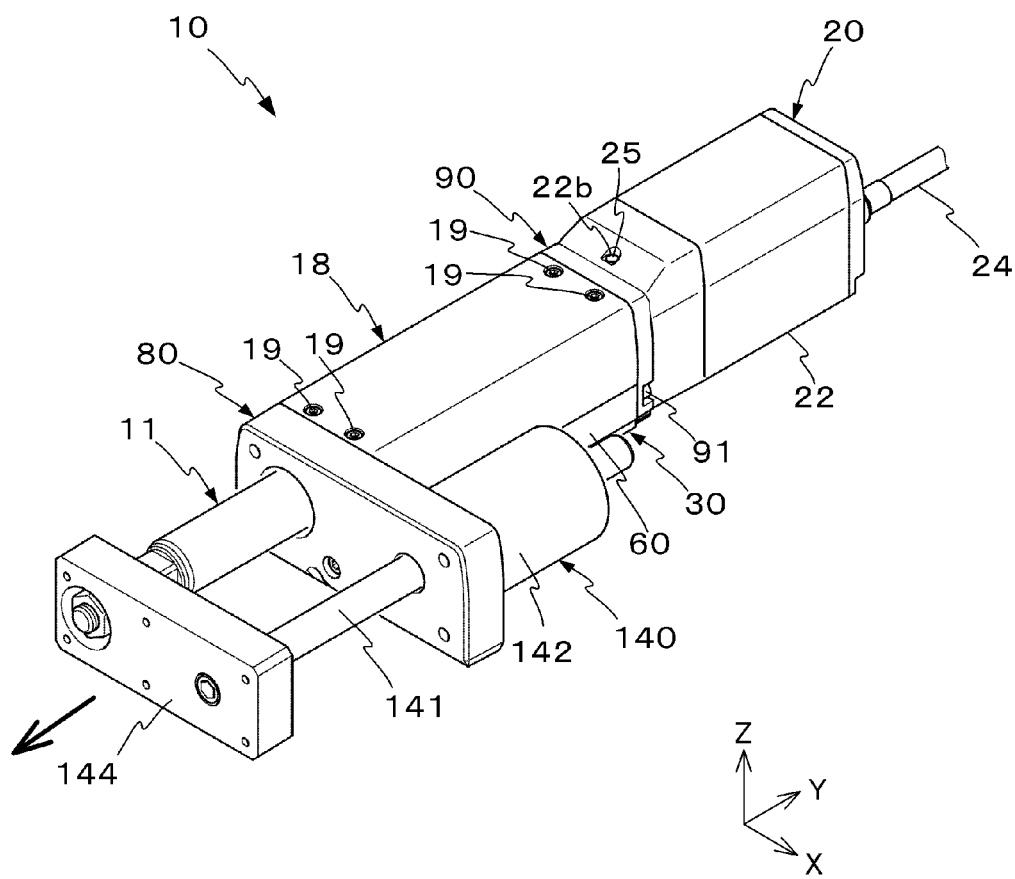
FIG. 32 is a perspective view for explaining an operation of the actuator according to the fourth modified example.

According to the actuator 10 of this fourth modified example, when the rod 11 that is a work shaft moves in the −Y direction, since the rod 11 is linked with the guide rod 141 by the linkage 144, as illustrated in FIG. 32, the guide rod 141 also moves in the −Y direction. At this time, when the guide rod 141 moves in the −Y direction, the balls 145 roll in the space between the inner periphery of the slit 143a and the outer periphery of the guide rod 141. The balls 145 rolling the space between the inner periphery of the slit 143a and the outer periphery of the guide rod 141 move to the ball circulation channel 143b. Next, the balls pass through the ball circulation channel 143b, and move again to the space between the inner periphery of the slit 143a and the outer periphery of the guide rod 141, and keep rolling.

According to the actuator 10 of this fourth modified example, since the guide rod unit 140 is provided, the rigidity of the leading end (the end at the −Y side) of the rod 11 can be enhanced. Accordingly, it becomes possible for the actuator 10 to suppress an occurrence of the wobbling of the leading end of the rod 11. In addition, it becomes possible for the rod 11 to smoothly and stably reciprocate in the Y-axis direction.

According to the actuator 10 of this fourth modified example, the ball bushing 143 is fitted in the bushing bearing 142. The present invention is, however, not limited to this structure, and a slide bearing like an oil-less bearing may be fitted therein.

Fifth Modified Example

Figure 33:
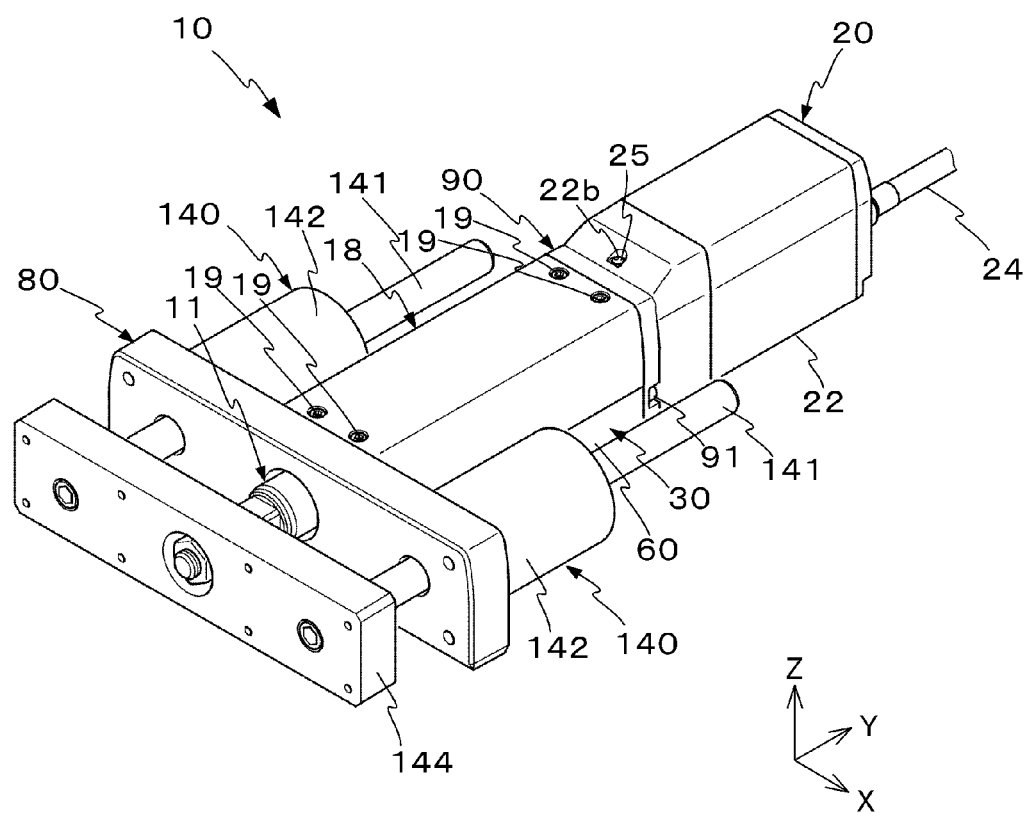
FIG. 33 is a perspective view illustrating an actuator according to a fifth modified example.

As illustrated in FIG. 33, the actuator 10 of a fifth modified example includes a pair of guide rod units 140. Hence, in comparison with the actuator 10 of the fourth modified example, the actuator of this modified example is capable of further enhancing the rigidity of the leading end (the end at the −Y side) of the rod 11. This results in a further suppression of an occurrence of the wobbling of the leading end of the rod 11. In addition, it becomes possible for the rod 11 to further smoothly and stably reciprocate in the Y-axis direction.

Although the actuator 10 of this fifth modified example includes the pair of guide rod units 140, the present invention is not limited to this structure, and the actuator may include equal to or greater than three guide rod units 140. In this case, it becomes possible for the actuator to further enhance the rigidity of the leading end (the end at the −Y side) of the rod 11.

Sixth Modified Example

Figure 34:
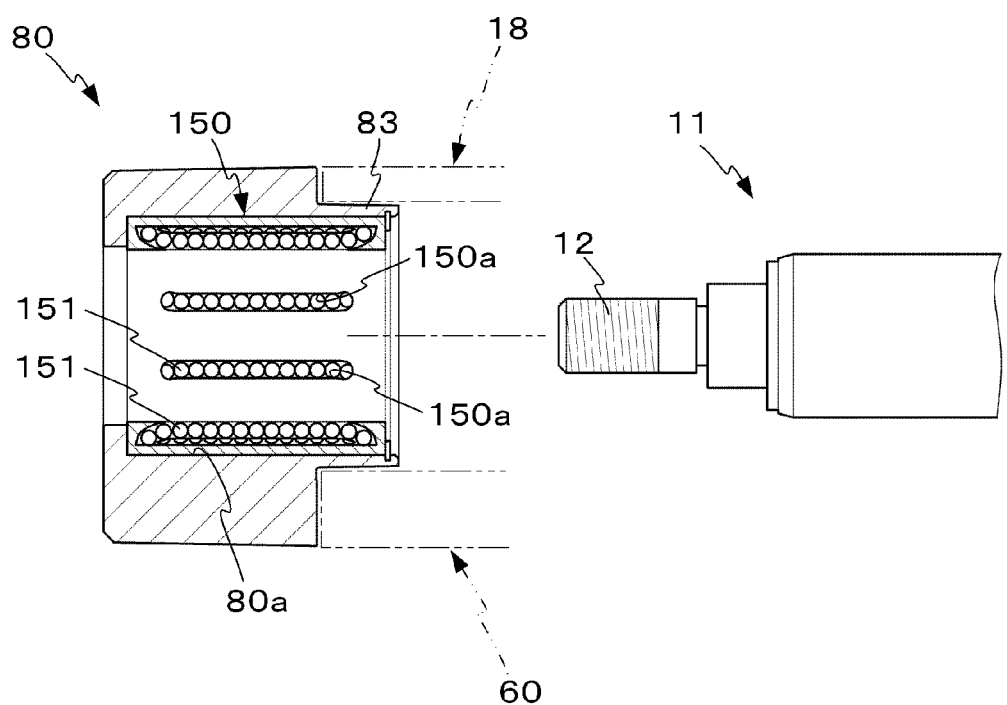
FIG. 34 is a Y-Z cross-sectional view illustrating a front housing and the like according to a sixth modified example.

In the above-explained embodiment illustrated in FIGS. 1 to 24, the oil-less bearing 82 is disposed in the front housing 80 to enable the rod 11 to move in the Y-axis direction, but the supporting structure itself is optional. An explanation will be given of a sixth modified example which employs a ball bushing 150 as a supporting structure of the rod 11 with reference to FIG. 34.

The ball bushing 150 smoothly moves the rod 11 upon rolling of balls 151 disposed inside the ball bushing. The ball bushing 150 employs a similar structure as that of the ball bushing 143 of the guide rod unit 140 according to the above-explained fourth modified example. Balls 151 roll while being held between the inner periphery of a slit 150a formed in the inner periphery of a through-hole of the ball bushing 150 and the outer periphery of the rod 11, thereby allowing the rod 11 to move in the Y-axis direction.

According to the sixth modified example, since the ball bushing 150 is disposed in the front housing 80, it becomes possible for the rod 11 to smoothly and stably reciprocate in the Y-axis direction.

Seventh Modified Example

Figure 35:
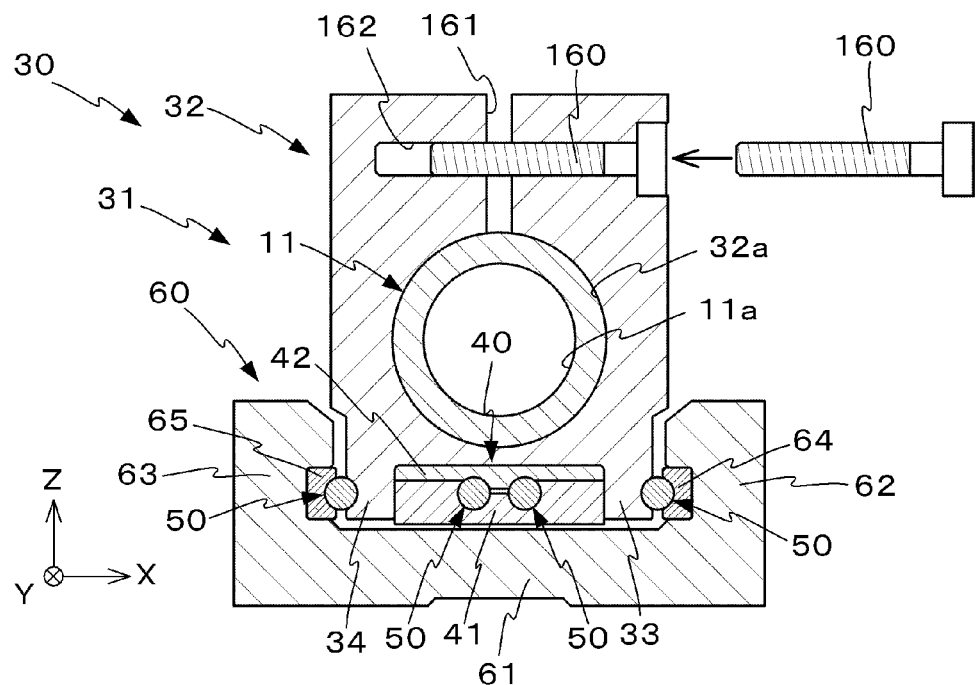
FIG. 35A is a (first) X-Z cross-sectional view illustrating a slider, a rod, and the like according to a seventh modified example.
FIG. 35B is a (second) X-Z cross-sectional view illustrating the slider, the rod, and the like according to the seventh modified example.
Figure 35:
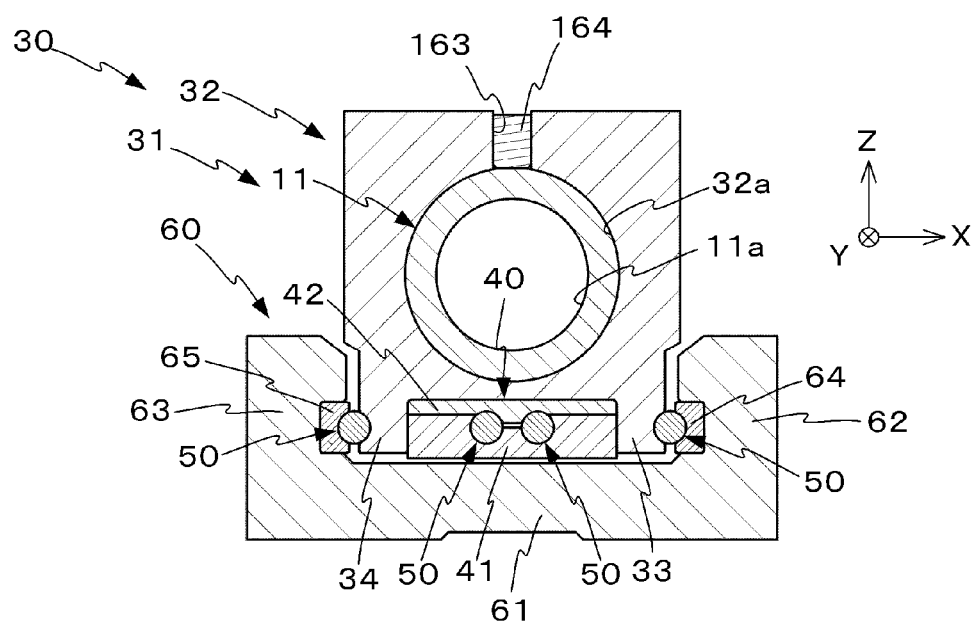
Figure 36:
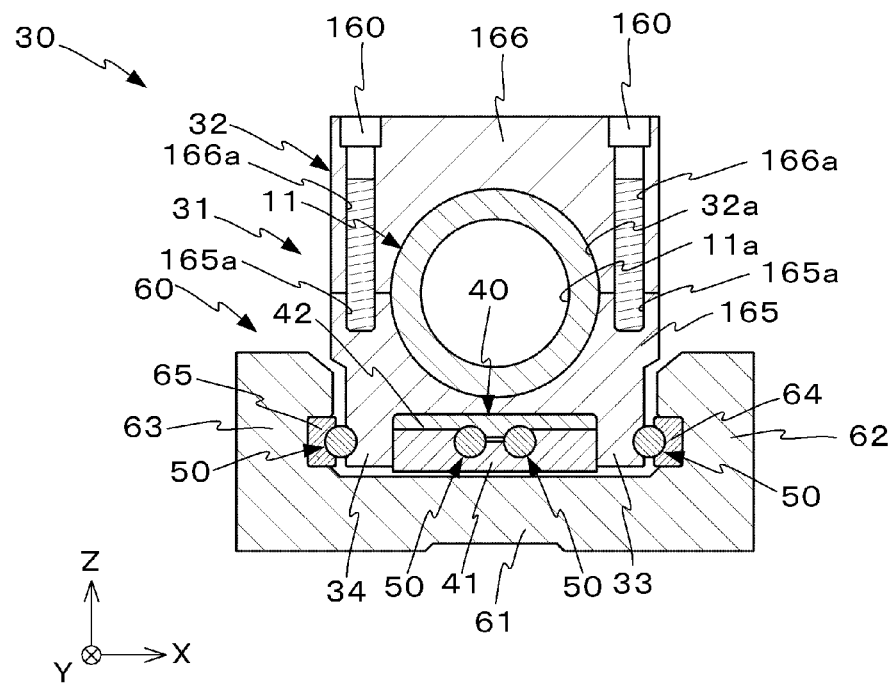
FIG. 36A is a (third) X-Z cross-sectional view illustrating the slider, the rod, and the like according to the seventh modified example.
FIG. 36B is a Y-Z cross-sectional view illustrating the slider, the rod, and the like according to the seventh modified example.
Figure 36:
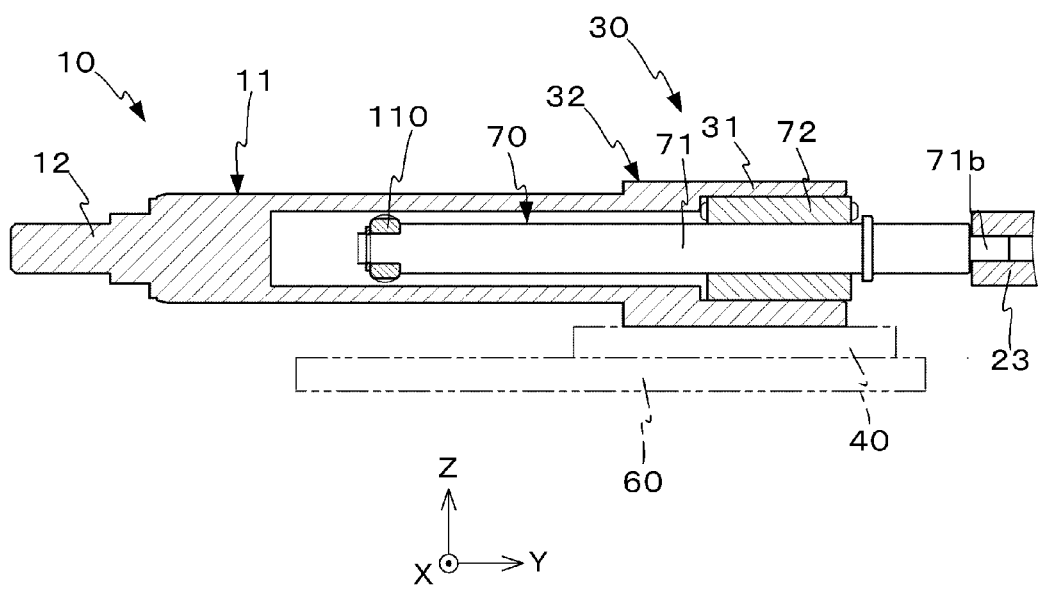

According to the above-explained embodiment illustrated in FIGS. 1 to 24, as is clear from FIG. 14, the rod 11 is fastened to the slider 31 by screwing, but how to fasten is optional. An explanation will be given of another fastening technique of the rod 11 with reference to FIGS. 35 and 36.

According to the guide apparatus 30 illustrated in FIG. 35A, an expansion slot 161, and a threaded hole 162 passing all the way through the expansion slot 161 are formed in the upper part of the slider main body 32. Next, when the rod 11 is fastened to the slider 31, first, the rod 11 is fitted in the through-hole 32a formed in the slider main body 32. Subsequently, the bolt 160 is engaged with the threaded hole 162. By screwing the bolt 160, the gap of the expansion slot 161 becomes small, and thus the diameter of the through-hole 32a formed in the slider main body 32 becomes small. As a result, the rod 11 is fastened to the slider 31. According to such a fastening technique, the rod 11 can be firmly fastened.

According to the guide apparatus 30 illustrated in FIG. 35B, a threaded hole 163 in communication with the through-hole 32b is formed in the upper face (the surface at the +Z side) of the slider main body 32. When the rod 11 is fastened to the slider 31, first, the rod 11 is fitted in the through-hole 32a formed in the slider main body 32 of the slider 31, and a set screw 164 is engaged with the threaded hole 163. By screwing in the set screw 164, the tip of the set screw 164 abuts the outer periphery of the rod 11, and as a result, the rod 11 is fastened to the slider 31. An example set screw 164 applied is a screw plug.

According to the guide apparatus 30 illustrated in FIG. 36A, the slider main body 32 is formed of two members. More specifically, the slider main body 32 includes a lower member 165, and an upper member 166 attached to the +Z side of the lower member 165. Threaded holes 165a to be engaged with respective bolts 160 are formed in the lower member 165. In addition, insertion holes 166a for allowing the respective bolts 160 to be inserted therein are formed in the upper member 166 in a manner coaxial with the respective threaded holes 165a. When the rod 11 is fastened, the bolt 160 is engaged with the threaded hole 165a to hold the rod 11 between the lower member 165 and the upper member 166. Accordingly, the rod 11 is fastened to the slider 31.

The fastening techniques of the rod 11 are not limited to the ones illustrated in FIGS. 35A, 35B, and 36A. For example, the rod 11 may be fastened to the slider 31 by welding. In addition, the rod 11 may be fastened to the slider 31 by, for example, friction joining, caulking, press-fitting, thermal insertion, cooling fitting, and clamping. Still further, as illustrated in FIG. 36B, the rod 11 and the slider main body 32 may be formed integrally.

Eighth Modified Example

Moreover, as illustrated in FIG. 24, the actuator 10 of the above-explained embodiment is fastened to the work bench 120 by bolts 121 from the upper side (+Z side, the front side of the actuator 10) by detaching the cover 18. However, how to fasten the actuator 10 is optional. For example, from the lower side of the work bench 120 (the rear side of the actuator 10), bolts are inserted in the holes of the work bench 120 and the through-holes 61a formed in the base 61 of the rail 60, and engaged with respective nuts, thereby fastening the actuator 10 to the work bench 120. In addition, the inner periphery of the through-hole 61a may be formed as a threaded face, and the bolts may be inserted in the holes of the work bench 120 from the lower side of the work bench 120, and engaged with the through-holes 61a formed in the base 61, thereby fastening the actuator 10 to the work bench 120.

Figure 37:
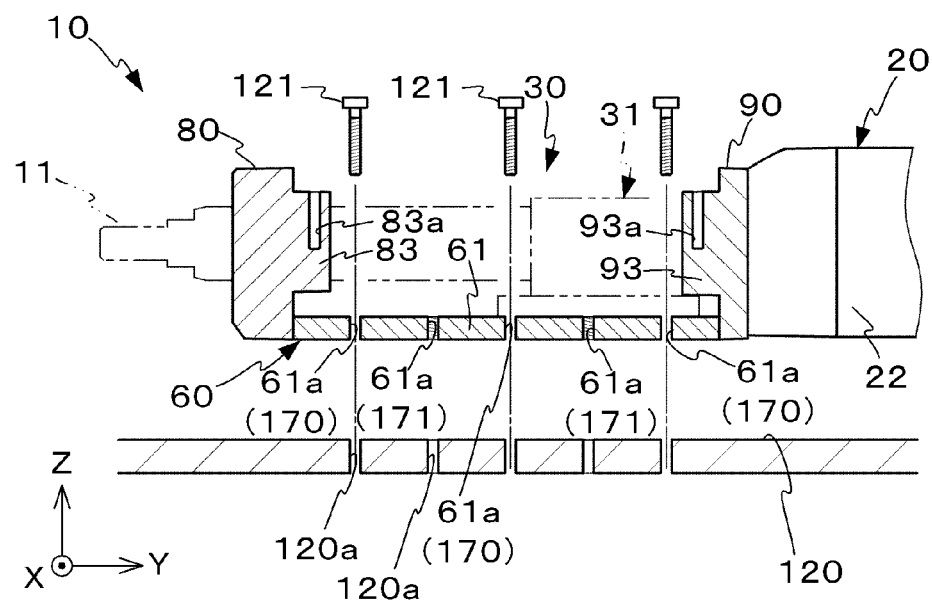
FIG. 37A is a (first) Y-Z cross-sectional view illustrating an actuator according to an eighth modified example.
FIG. 37B is a (second) Y-Z cross-sectional view illustrating the actuator according to the eighth modified example.
Figure 37:
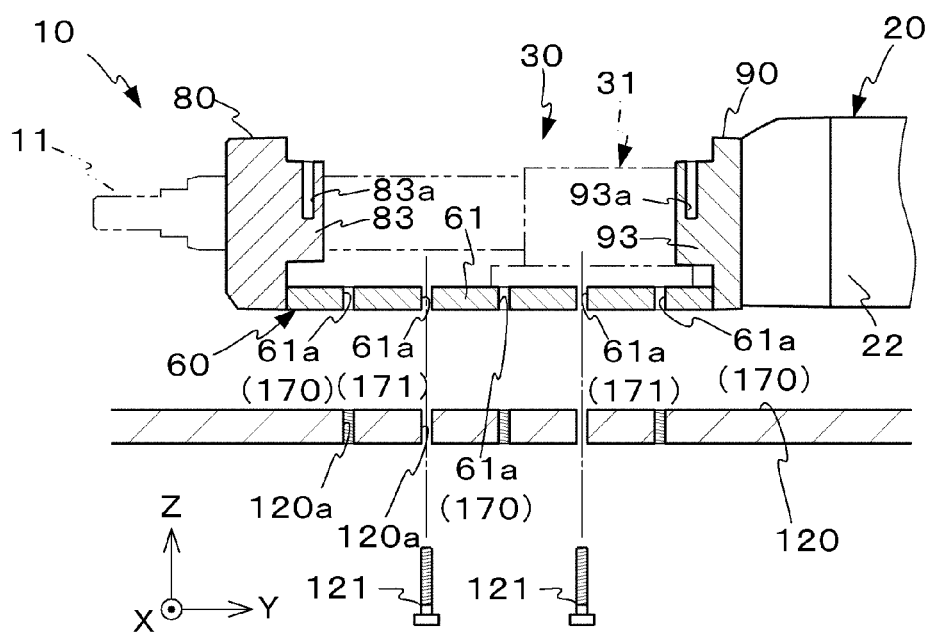

As illustrated in FIGS. 37A and 37B, the through-holes 61a formed in the base 61 of the rail 60 may be holes of two kinds: an insertion hole 170 having a flat inner periphery; and a threaded hole 171 having a threaded inner periphery. When, for example, a total of 10 through-holes 61a are formed, six insertion holes 170 may be formed, and four threaded holes 171 may be formed.

When, for example, the through-holes 61a are only the one kind that are the threaded holes, with the bolts being inserted in the holes of the work bench 120 from the lower side thereof, the actuator 10 is fastened to the work bench 120. In this case, since the through-holes 61a are threaded holes, it is difficult to insert the bolts in the through-holes 61a from the upper side of the work bench 120, and to fasten the actuator 10 to the work bench 120.

When, however, the through-holes 61a are the holes of the two kinds that are the insertion holes 170 and the threaded holes 171, a worker who attempts to attach the actuator 10 becomes able to attach the actuator 10 from the upper side (front side) thereof as illustrated in FIG. 37A, or to attach the actuator from the rear side (lower side) of the work bench 120 as illustrated in FIG. 37B in accordance with the installation environment of the actuator 10.

Ninth Modified Example

Figure 38:
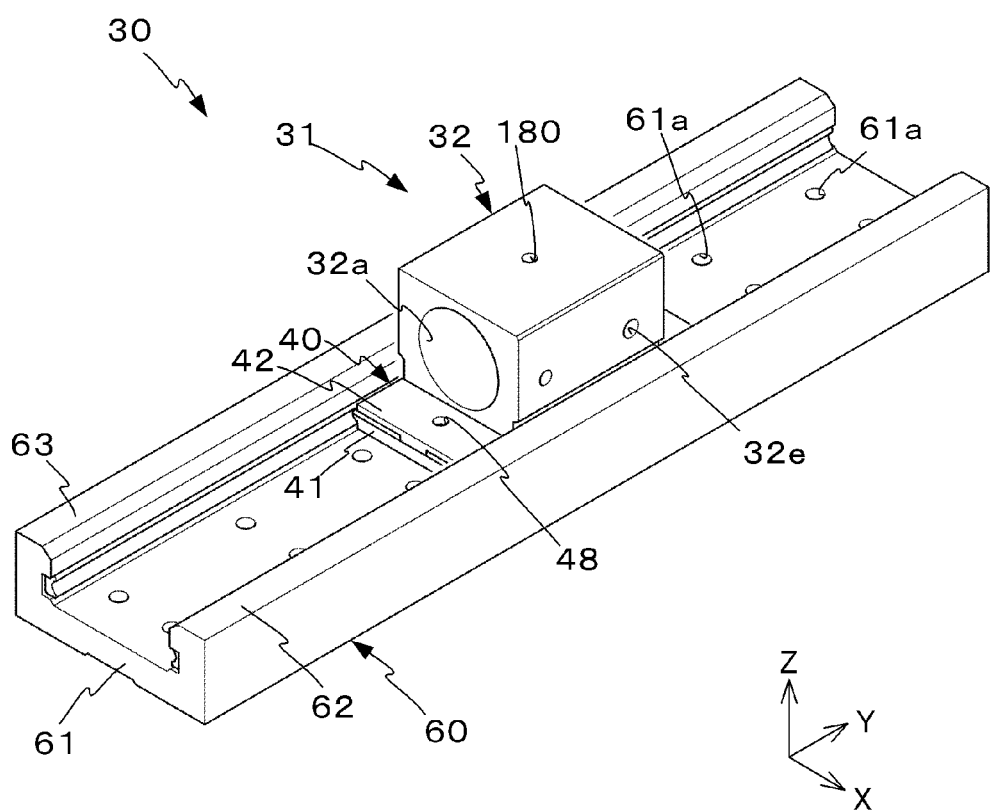
FIG. 38 is a perspective view illustrating a guide apparatus according to a ninth modified example.

According to the guide apparatus 30 of a ninth modified example, as illustrated in FIG. 38, a service hole 180 for filling grease is formed in the slider main body 32 of the slider 31. The service hole 180 is in communication with the through-hole 32a via a grease channel formed in the interior of the slider main body 32. When grease is filled through this service hole 180, the grease is supplied to rigid ball elements fitted between the ball screw nut 72 and the ball screw shaft 71.

In the actuator 10 with the guide apparatus 30 according to the ninth modified example, grease for rigid ball elements of the ball screw 70 can be filled from the service hole 180 formed in the slider main body 32. In the case of, for example, an actuator having no cover, in order to fill grease for the ball elements of the ball screw 70, it is necessary to disassemble the casing and the like, and thus a grease filling work takes a time. According to the ninth modified example, however, by detaching the cover 18, grease can be filled to the ball elements of the ball screw 70 from the service hole 180. Accordingly, the workability for a grease filling work can be improved. In addition, since the service hole 48 for filling grease to the balls 50 of the guide apparatus 30 is also formed in the return 40 of the slider 31, detachment of the cover 18 enables filling of grease to both of the ball elements of the ball screw 70 and the balls 50 of the guide apparatus 30. Hence, the workability for a grease filling work can be further improved.

The present invention permits various embodiments and modifications without departing from the broadest scope and spirit of the present invention. The above-explained embodiments are to explain the present invention, and are not to limit the scope and spirit of the present invention.

This application claims the benefit of Japanese Patent Application No. 2011-155183 filed on Jul. 13, 2011, and Japanese Patent Application No. 2011-264151 filed on Dec. 1, 2011. The entire specifications, claims, and drawings of Japanese Patent Applications No. 2011-155183 and No. 2011-264151 are herein incorporated in this specification by reference.

REFERENCE SIGNS LIST

1 Actuator
11 Rod (work shaft)
11a Hole
11b Male screw
12 Leading end attachment
18 Cover
18a Through-hole
19 Bolt
20 Motor unit
21 Motor
22 Motor housing
22a Opening
22b Threaded hole
23 Output shaft (rotation shaft)
24 Actuator cable
25 Bolt
30 Guide apparatus
31 Slider
32 Slider main body
32a Through-hole
32b Female screw
32c Threaded hole
32d Boss hole
32e Hole
33, 34 Convexities
33a, 34a Grooves (first grooves)
36 Ring
40 Return
41 Casing
41a Through-hole
42 Lid
42a Boss hole
42b Through-hole
43, 44 Ball circulation channels
43a, 44a Straight channels
43b, 44b Curved channels
45, 46 Recesses
47 Boss
48 Service hole
49 Bolt
50 Balls (rolling elements)
60 Rail
61 Base
61a Through-hole
62, 63 Side walls
62a, 63a Recesses
64, 65 Steel members
64a, 65a Grooves (second grooves)
70 Ball screw
71 Ball screw shaft
71a Ball screw shaft main body
71b, 71c Small diameter portion
72 Ball screw nut
74 Bolt 80 Front housing
80a Through-hole
81 Bolt
82 Oil-less bearing
83 Protrusion
90 Bearing housing
90a Through-hole
91 Bolt
92 Bearing
92a Bearing holder
93, 95 Protrusions
94 Shock absorbers
110 Elastic member
110a Through-hole
111 Groove
112 Stopper member
120 Work bench
120a Threaded hole
121 Bolt
130 Convexity
131 Roller
132, 133 Protrusions
140 Guide rod unit (guide shaft unit)
141 Guide rod (guide shaft)
142 Bushing housing
143 Ball bushing (guide shaft supporter)
143a Slit
143b Ball circulation channel
144 Linkage
145 Ball (rolling element)
Ball bushing (work shaft supporter)
150a Slit
151 Ball
160 Bolt
161 Expansion slot
162 Threaded hole
163 Threaded hole
164 Set screw
165 Lower member
165a Threaded hole
166 Upper member
166a Insertion hole
170 Insertion hole
171 Threaded hole
180 Service hole
T1, T2 Raceways
R1, R3 Curvature radii
R2 Radius
S Space

The invention claimed is:

1. An actuator comprising:
a motor including a rotation shaft;
a ball screw comprising a ball screw shaft that rotates together with a rotation of the rotation shaft, and a ball screw nut that linearly moves together with a rotation of the ball screw shaft;
a guide apparatus comprising a slider that is coupled with the ball screw nut so as to linearly move together with the ball screw nut, and that is provided with a through-hole and first grooves running along the direction that the slider linearly moves; a rail that faces the first grooves and is provided with second grooves running along the direction that the slider linearly moves; and a rolling element that rolls over the first grooves and the second grooves upon being held between the first grooves and the second grooves, and supports the slider in a movable manner; and
a work shaft that is fastened to the through-hole provided in the slider of the guide apparatus.

2. The actuator according to claim 1, wherein:
the slider comprises a rolling element retaining unit having a rolling element circulation channel formed in an interior of the rolling element retaining unit, the rolling element passing through the rolling element circulation channel; and
the rolling element that has rolled a space between the first groove and the second groove passes through the rolling element circulation channel, moves to the space between the first groove and the second groove, and rolls again the space between the first groove and the second groove.

3. The actuator according to claim 2, wherein:
the rolling element is formed in a spherical shape;
internal faces of the first groove and the second groove are each formed as a curved face; and
a curvature radius of the curved face is substantially equal to a radius of the rolling element.

4. The actuator according to claim 3, wherein:
the slider comprises the two first grooves, and the rail comprises the two second grooves and the two rolling element circulation channels; and
the rolling element is held between the first groove and the second groove in a direction orthogonal to the actuation direction of the work shaft.

5. The actuator according to claim 1, wherein:
the work shaft is formed in a cylindrical shape having a hole formed therein where a leading end of the ball screw shaft is to be inserted; and
an elastic member, comprising a single material, that contacts an inner periphery of the hole of the work shaft is disposed at the leading end of the ball screw shaft.

6. The actuator according to claim 5, wherein the elastic member has a groove formed along the actuation direction of the work shaft.

7. The actuator according to claim 6, wherein a plurality of the grooves formed in the elastic member are formed along a circumference around a center of the ball screw shaft at an equal interval.

8. The actuator according to claim 1, further comprising a cover that is attached to the rail in a freely detachable manner and covers the slider.

9. The actuator according to claim 1, wherein:
a male screw is formed on the work shaft;
a female screw is formed on the slider; and
the work shaft is fastened to the slider upon engagement of the male screw with the female screw.

10. The actuator according to claim 1, wherein:
an expansion slot is formed in the slider; and
the work shaft is fastened to the slider by reducing a slot width of the expansion slot.

11. The actuator according to claim 1, wherein:
a threaded hole for fitting therein a set screw is formed in the slider; and
the work shaft is fastened to the slider upon abutment with the set screw fitted in the threaded hole.

12. The actuator according to claim 11, further comprising a work shaft supporter that is disposed near the leading end of the work shaft, and supports the work shaft in a manner movable linearly,
wherein the work shaft supporter comprises a rolling element that rolls a space between the work shaft supporter and the work shaft.

13. The actuator according to claim 1, further comprising a guide shaft unit that comprises:

a guide shaft that guides a linear motion of the work shaft through a linear motion together with a linear motion of the work shaft; and a guide shaft supporter that supports the guide shaft in a manner movable linearly.

14. The actuator according to claim 13, wherein the guide shaft unit is formed at both sides of the work shaft so as to hold there between the work shaft.

15. The actuator according to claim 14, wherein the guide shaft supporter comprises a rolling element that rolls a space between the guide shaft supporter and the guide shaft.

16. The actuator according to claim 1, wherein the two sliders are fastened to the work shaft.

17. The actuator according to claim 1, wherein the slider comprises a slider main body that is a member comprising a single material, and that is formed with both the through-hole running through in the direction that the slider linearly moves, and the first grooves running parallel to the direction that the slider linearly moves.

* * * * *